United States Patent
Takeuchi et al.

(10) Patent No.: US 9,630,610 B2
(45) Date of Patent: Apr. 25, 2017

(54) DRIVING FORCE CONTROL SYSTEM FOR VEHICLE

(75) Inventors: Keisuke Takeuchi, Susono (JP); Takeshi Hayashi, Okazaki (JP); Yoshimitsu Agata, Numadu (JP); Toshio Tanahashi, Susono (JP); Shin Noumura, Yamato (JP); Kazuo Tsuruoka, Susono (JP); Hiroki Kaneko, Susono (JP); Tomoyuki Honda, Numazu (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/347,346

(22) PCT Filed: Sep. 27, 2011

(86) PCT No.: PCT/JP2011/071963
§ 371 (c)(1),
(2), (4) Date: Apr. 28, 2014

(87) PCT Pub. No.: WO2013/046308
PCT Pub. Date: Apr. 4, 2013

(65) Prior Publication Data
US 2015/0127200 A1    May 7, 2015

(51) Int. Cl.
*B60W 10/06*   (2006.01)
*F02D 29/02*   (2006.01)
(Continued)

(52) U.S. Cl.
CPC ............ *B60W 10/06* (2013.01); *B60W 10/04* (2013.01); *B60W 10/10* (2013.01); *B60W 10/11* (2013.01);
(Continued)

(58) Field of Classification Search
CPC .. B60W 10/06; B60W 20/10; B60W 30/1882; B60W 10/11; B60W 10/10;
(Continued)

(56) References Cited

U.S. PATENT DOCUMENTS

| | | |
|---|---|---|
| 5,114,383 A | 5/1992 | Hirano et al. |
| 5,557,521 A | 9/1996 | Danz et al. |

(Continued)

FOREIGN PATENT DOCUMENTS

| | | |
|---|---|---|
| DE | 102007044401 A1 | 3/2009 |
| EP | 0953470 A2 | 11/1999 |

(Continued)

OTHER PUBLICATIONS

Machine Translation JP 2005-124282 A, Ueoka.*
(Continued)

*Primary Examiner* — Rodney Butler
*Assistant Examiner* — Frederick Brushaber
(74) *Attorney, Agent, or Firm* — Andrews Kurth Kenyon LLP

(57) ABSTRACT

A driving force control system for a vehicle having a mechanism for changing an engine speed continuously. The driving force control system basically controls said mechanism in a manner such that the engine speed is adjusted to optimize fuel economy. The driving force control system is configured to determine an index representing a demand to enhance agility of behavior of the vehicle based on an actual behavior of the vehicle or an amount of operation carried out by a driver to cause said behavior. An upper limit value of the engine speed of the case in which a drive demand is increased is determined on the basis of the index, and the upper limit value is set to the higher value with an increase in the index representing the demand to enhance agility of behavior of the vehicle.

14 Claims, 13 Drawing Sheets

(51) Int. Cl.
*B60W 30/188* (2012.01)
*B60W 10/04* (2006.01)
*B60W 10/11* (2012.01)
*B60W 10/10* (2012.01)
*B60W 20/10* (2016.01)

(52) U.S. Cl.
CPC ........ *B60W 20/10* (2013.01); *B60W 30/1882* (2013.01); *F02D 29/02* (2013.01); *B60W 2710/0644* (2013.01); *F02D 2700/07* (2013.01)

(58) Field of Classification Search
CPC ............ B60W 10/04; B60W 2710/0644; F02D 29/02; F02D 2700/07
USPC ............................................................ 701/22
See application file for complete search history.

(56) References Cited

U.S. PATENT DOCUMENTS

| | | | |
|---|---|---|---|
| 5,895,435 A | 4/1999 | Ohta et al. | |
| 6,029,107 A * | 2/2000 | Sato | F16H 61/66259 477/120 |
| 6,066,070 A | 5/2000 | Ito et al. | |
| 6,169,949 B1 | 1/2001 | Sato | |
| 6,275,759 B1 * | 8/2001 | Nakajima | B60K 6/543 123/179.4 |
| 6,637,530 B1 | 10/2003 | Endo et al. | |
| 8,972,087 B2 * | 3/2015 | Takeuchi | B60K 6/445 701/1 |
| 2003/0216847 A1 * | 11/2003 | Bellinger | B60W 30/1819 701/51 |
| 2006/0113129 A1 * | 6/2006 | Tabata | B60K 6/365 180/65.25 |
| 2008/0097674 A1 | 4/2008 | Kuwahara et al. | |
| 2008/0228334 A1 * | 9/2008 | Hashimoto | B60K 6/365 701/22 |
| 2008/0242500 A1 | 10/2008 | Asaoka | |
| 2008/0305927 A1 | 12/2008 | Gierling et al. | |
| 2009/0076692 A1 | 3/2009 | Aigner et al. | |
| 2009/0099727 A1 | 4/2009 | Ghoneim | |
| 2009/0181771 A1 | 7/2009 | Sogabe | |
| 2010/0087288 A1 * | 4/2010 | Yamamoto | B60K 6/445 477/3 |
| 2011/0166755 A1 | 7/2011 | Eguchi et al. | |
| 2011/0218720 A1 * | 9/2011 | Arai | F16H 61/16 701/55 |
| 2012/0136506 A1 | 5/2012 | Takeuchi et al. | |
| 2013/0131940 A1 * | 5/2013 | Yamamoto | F02D 29/00 701/54 |
| 2013/0166121 A1 * | 6/2013 | Takeuchi | B60K 6/445 701/22 |
| 2014/0195090 A1 * | 7/2014 | Takeuchi | F02D 11/105 701/22 |

FOREIGN PATENT DOCUMENTS

| | | |
|---|---|---|
| JP | 61-192957 A | 8/1986 |
| JP | 3-121349 A | 5/1991 |
| JP | 10-077893 A | 3/1998 |
| JP | 11-294547 A | 10/1999 |
| JP | 2001-112115 A | 4/2001 |
| JP | 2005-076673 A | 3/2005 |
| JP | 2005-113946 A | 4/2005 |
| JP | 2005-124282 A | 5/2005 |
| JP | 2006-046383 A | 2/2006 |
| JP | 2007198413 A | 8/2007 |
| JP | 2008-101742 A | 5/2008 |
| JP | 2008-540951 A | 11/2008 |
| JP | 2009-166516 A | 7/2009 |
| WO | 2011/021634 A1 | 2/2011 |

OTHER PUBLICATIONS

Supplemental Notice of Allowability issued on Oct. 4, 2016 in US. Appl. No. 14/238,365 (copy of issue fee payment attached).
Notice of Allowance issued on Jul. 14, 2016 in U.S. Appl. No. 14/238,365.

* cited by examiner

DRIVING FORCE CONTROL SYSTEM FOR VEHICLE

CROSS-REFERENCE TO RELATED APPLICATIONS

This is a national phase application based on the PCT International Patent Application No PCT/JP2011/071963 filed on Sep. 27, 2011, the entire contents of which are incorporated herein by reference.

TECHNICAL FIELD

The present invention relates to a control system for controlling a driving force of a vehicle, and especially to a control system for controlling a prime mover to comply with a driving preference (or intention) of a driver.

BACKGROUND ART

A driving force of an automobile is governed by an output of an engine with respect to an opening degree of an accelerator and a speed ratio of a transmission connected with the engine. Basically, such relation is determined according to a grade of a vehicle at a designing or planning stage. However, a required driving force differs according to a road condition, a driving preference of a driver of the vehicle and so on. Therefore, it is preferable to adjust characteristics of the driving force and the speed ratio in accordance with the road condition and the driving preference of the driver.

For example, PCT international publication WO2011/021634 discloses a vehicle control system configured to control characteristics of driving force, speed ratio, suspension etc. based on a command index representing driving preference of the driver that is obtained based on a synthesized acceleration of the longitudinal acceleration and lateral acceleration. In turn, Japanese Patent Laid-Open No. 2005-113946 discloses a control device for continuously variable transmission configured to change a speed ratio of the continuously variable transmission stepwise. According to the teachings of Japanese Patent Laid-Open No. 2005-113946, an upper limit speed of an engine speed is determined in view of durability of the continuously variable transmission, and a lower limit speed of the engine speed is determined in view of avoiding an engine stall. When the engine speed reaches the upper limit, an upshifting is carried out to lower the engine speed. By contrast, when the engine speed reaches the lower limit, a downshifting is carried out to raise the engine speed.

A belt driven continuously variable transmission and a toroidal type continuously variable transmissions are adapted to change a speed ratio continuously. Also, a speed ratio of a hybrid vehicle can be changed substantially continuously by controlling the engine speed arbitrarily by a motor. Therefore, a speed ratio of the vehicle having the continuously variable transmission or the hybrid vehicle is basically controlled in a manner to drive the engine at an operating point at which fuel economy is optimized. To this end, specifically, an engine speed at which the fuel economy is optimized is determined on a constant output curve governed by an engine torque and an engine speed, and a speed ratio is controlled in a manner to adjust the engine speed to the determined speed at which the fuel economy is optimized with respect to a current vehicle speed or an output speed. At the same time, an engine torque is adjusted by controlling an opening degree of a throttle valve. The invention taught by PCT international publication WO2011/021634 is applied to the vehicle thus structured to adjust the driving force in line with the driving preference of the driver, and to adjust a suspension in a manner to achieve a sporty running.

When an accelerator pedal is depressed deeply by the driver to accelerate the vehicle, a target output is changed according to an opening degree of the accelerator. However, an output of the engine is delayed inevitably to achieve the target output. Therefore, if the driver has a desire to accelerate the vehicle abruptly, the driver may further depress the accelerator pedal to cover shortage of the engine output caused by the delay in augmentation of the engine output. That is, if the driver has a desire to accelerate the vehicle greatly and promptly, the driver may depress the accelerator pedal more than necessary. As a result, the engine speed to achieve the target output will be increased to reach the upper limit speed of the vehicle. If the accelerator pedal is returned after the engine speed reached the upper limit speed so that the vehicle speed was increased, the engine speed will be lowered to achieve the required power thus reduced while optimizing the fuel economy. Thus, if the conventional vehicle in which a speed ratio is changed continuously is accelerated significantly, the engine speed may reach the maximum allowable speed of the vehicle, and when the accelerating operation is cancelled, the engine speed will be lowered significantly to the speed to optimize the fuel economy. In short, an amount of change of the engine speed is large. In addition, an intermediate speed between those speeds may not be set, that is, the engine may not be allowed to be driven at a driving point to achieve the intermediate speed. Further, when the accelerating operation is carried out to accelerate the vehicle greatly, the engine speed may reach the upper limit speed irrespective of an operating amount. Therefore, the driver may feel a delay in augmentation of the vehicle speed behind an augmentation of the engine speed.

DISCLOSURE OF THE INVENTION

The present invention has been conceived noting the technical problems thus far described, and its object is to provide a driving force control system that is applied to a vehicle in which a speed ratio is changed continuously, and that is configured to provide a driver with a required drive feel by setting an upper limit value of an engine speed with respect to a drive demand.

The driving force control system of the present invention is applied to a vehicle which has a mechanism for changing an engine speed continuously, and the driving force control system has a basic characteristic to control said mechanism in a manner such that the engine speed is adjusted to optimize fuel economy. In order to achieve the above-mentioned object, the driving force control system is configured to determine an index representing a demand to enhance agility of behavior of the vehicle based on an actual behavior of the vehicle or an amount of operation carried out by a driver to cause said behavior. In addition, an upper limit value of the engine speed of the case in which a drive demand is increased is determined on the basis of the index, and the upper limit value is set to the higher value with an increase in the index representing the demand to enhance agility of behavior of the vehicle.

For example, a continuously variable transmission adapted to vary a speed ratio continuously may be used as the above-mentioned mechanism. In this case, the speed ratio thereof is maintained within a predetermined range of vehicle speed. That is, the speed ratio is controlled to be changed stepwise, and set to the larger ratio with an increase in the index representing the demand to enhance agility of behavior of the vehicle.

Thus, the speed ratio is changed stepwise, and the engine speed at which the speed ratio is shifted is set to the higher speed with an increase in the index representing the demand to enhance agility of behavior of the vehicle.

The driving force control system of the present invention may also be applied to a hybrid vehicle in which the engine speed is varied by a motor. In this case, an upper limit value or a lower limit value of the engine speed is restricted in accordance with a value of the index, and the restricted value of the upper limit value or the lower limit value is set to the higher value with an increase in the index representing the demand to enhance agility of behavior of the vehicle.

Thus, according to the present invention, the engine speed is basically controlled in a manner to improve the fuel economy. However, when the acceleration is demanded, the engine speed is increased in accordance with the demand to increase the engine power. Specifically, if the driver intends to accelerate the vehicle greatly, the upper limit value of the engine speed is set to the higher value in accordance with the index representing the intension of the driver. Therefore, the driver is allowed to drive the vehicle according to his/her preference. In contrast, if the driver intends to accelerate the vehicle but not especially to enhance the agility of the vehicle, the upper limit value of the engine speed is set to the relatively lower value in accordance with the index representing the intension of the driver. In this case, therefore, the engine speed of the vehicle can be adjusted according to the driver's intention when accelerate the vehicle. In addition, the acceleration can also be established as intended so that the driver is allowed to drive the vehicle according to his/her preference.

Provided that the present invention is applied to the vehicle having the continuously variable transmission, the driving force control system changes the speed ratio stepwise, and increase the speed ratio if the driver intends to enhance the agility of the vehicle.

Alternatively, the present invention may also be applied to the hybrid vehicle. As described, in the hybrid vehicle, the engine speed can be controlled by the motor. In this case, the upper limit value of the engine is achieved by the motor, and the lower limit value of the engine speed is restricted to the higher speed if the driver intends to enhance the agility of the vehicle. Therefore, the driver is also allowed to drive the vehicle according to his/her preference.

BEST MODE FOR CARRYING OUT THE INVENTION

Next, preferred examples of the present invention will be explained hereinafter. The control system of the present invention is applied to a vehicle accelerated and turned by operating predetermined devices, and the vehicle is driven by an internal combustion engine or a motor. The vehicle is comprised of a mechanism for continuously changing a speed ratio as a ratio of a speed of an output shaft to a speed of the engine. Preferably, a driving mode for changing the speed ratio stepwise by a manual operation (i.e., a manual mode) can be selected in the vehicle. For example, the driving mode for changing the speed ratio stepwise can be selected in a vehicle comprised of a belt-driven continuously variable transmission or a toroidal continuously variable transmission. In addition, the driving mode for changing the speed ratio stepwise may also be selected in a hybrid vehicle comprised of an engine and a motor serving as a prime mover, and a power distribution device adapted to perform a differential action among three rotary elements such as an input element, an output element and a reaction element. In the hybrid vehicle, the input element is connected with the engine, and the reaction element is connected with the motor. Therefore, in the hybrid vehicle, a rotational speed of the engine can be controlled by the motor. Basically, in those kinds of vehicles, the rotational speed of the engine is controlled in a manner such that the fuel economy is optimized.

Figure 11:
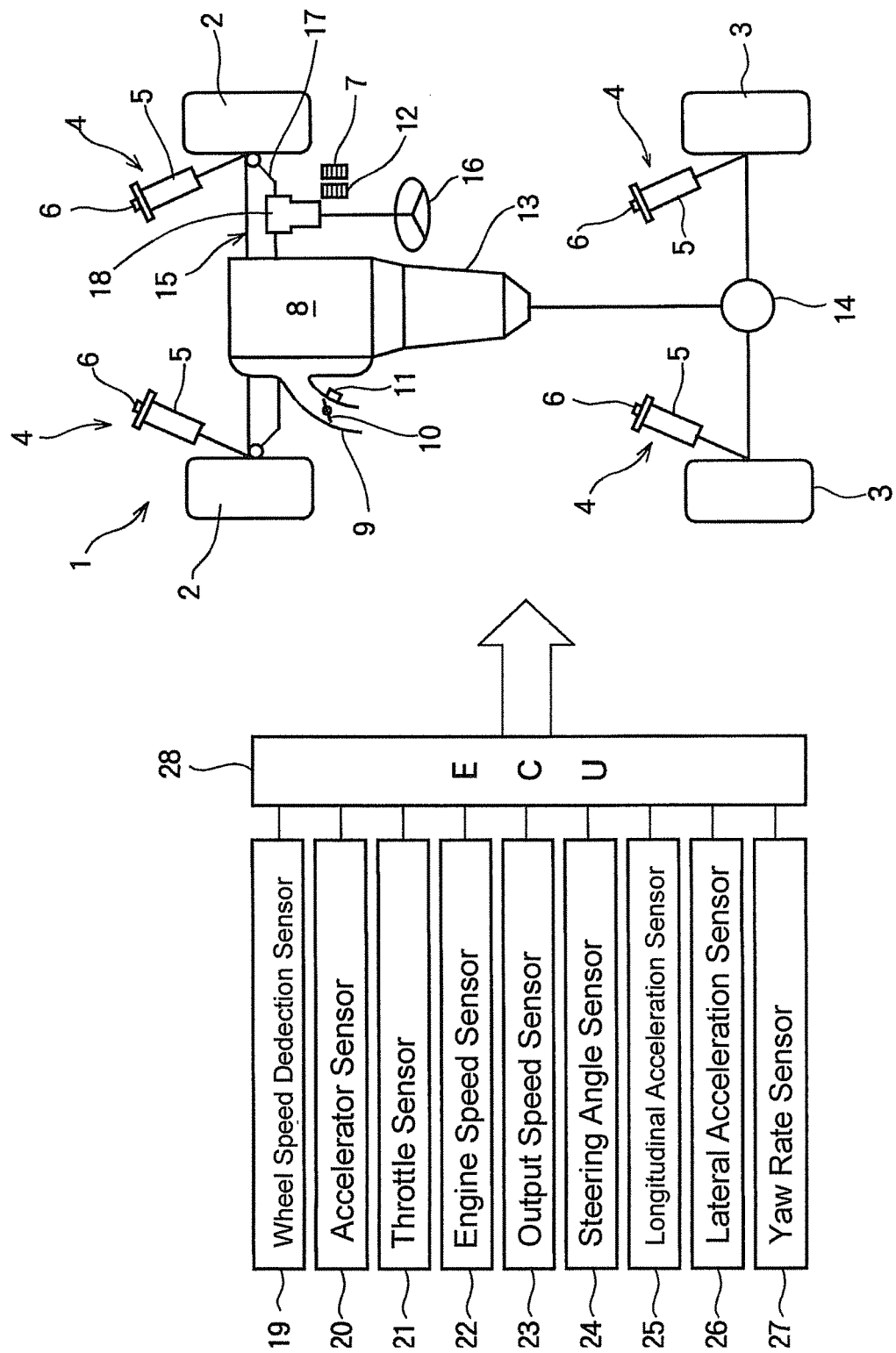
FIG. 11 is a view schematically showing a vehicle to which the driving force control system according to the present invention is applied.

Referring now to FIG. 11, there is shown an example of the vehicle comprised of a transmission. As shown in FIG. 11, a vehicle 1 is provided with a pair of front wheels 2 and a pair of rear wheels 3. Specifically, each of the front wheel 2 serve as a steering wheel, and each of the rear wheel 3 serves as a driving wheel. Those wheels 2 and 3 are individually attached to a not shown vehicle body via a suspension 4. The suspension 4 is a conventional suspension device comprised of a not shown spring and a shock absorber (i.e., a damper) 5. The shock absorber 5 shown in FIG. 11 is adapted to absorb a shock utilizing a flow resistance of air or liquid, and the flow resistance therein can be increased and decreased by a motor 6 functioning as an actuator. For example, in case of increasing the flow resistance in the shock absorber 5, a hardness of the suspension 4 in enhanced so that the vehicle 1 becomes difficult to be depressed. As a result, the drive feeling of the vehicle 1 becomes much sporty rather than comfortable. In addition, a height of the vehicle 1 can be adjusted by adjusting pressurized air in the shock absorber 5.

Although not especially shown in FIG. 11, the front and rear wheels 2 and 3 are provided individually with a brake mechanism. Those brake mechanisms are actuated to apply braking force to the wheels 2 and 3 by depressing a brake pedal 7 arranged in a driver seat.

A conventional internal combustion engine, a motor, a combination of the engine and the motor and so on may be used as a prime mover of the vehicle 1, and in the example shown in FIG. 11, an internal combustion engine 8 is used as the prime mover. As shown in FIG. 11, a throttle valve 10 for controlling air intake is arranged in an intake pipe 9 of the engine 8. Specifically, the throttle valve 10 is an electronic throttle valve that is opened and closed by an actuator 11 such as a motor controlled electrically. The actuator 11 is actuated in accordance with a depression of an accelerator pedal 12 arranged in the driver seat, that is, in accordance with an opening degree of an accelerator, thereby adjusting an opening degree of the throttle valve 10 to a desired angle.

A relation between an opening degree of the accelerator as a depression of the accelerator pedal 12 and an opening degree of the throttle valve 10 may be adjusted arbitrarily, and if a ratio of the opening degree of the accelerator to the opening degree of the throttle valve is approximately one to one, the throttle valve 10 reacts directly to the operation of the accelerator so that the sportiness of the vehicle 1 is enhanced. To the contrary, in case of reducing the opening degree of the throttle valve 10 relatively with respect to the opening degree of the accelerator, behavior or acceleration of the vehicle 1 is moderated. In case of using the motor as the prime mover, a current control device such as an inverter or a converter is used instead of the throttle valve 10. In this case, a relation between the opening degree of the accelerator and a current value, that is, the behavior or acceleration of the vehicle 1 is changed arbitrarily by adjusting the current in accordance with the opening degree of the accelerator by the current control device.

According to the example shown in FIG. 11, a transmission 13 is connected with an output side of the engine 8. The transmission 13 is adapted to change a speed change ratio between an input speed and an output speed arbitrarily. For example, a conventional belt-driven continuously variable transmission and a toroidal transmission may be used in the vehicle 1. Specifically, the transmission 13 is provided with a not shown actuator, and adapted to change the speed ratio thereof stepwise or continuously by controlling the actuator. Basically, the transmission 13 is controlled in a manner to optimize the speed ratio to improve fuel economy. For example, the speed ratio of the transmission 13 can be optimized by calculating a target output on the basis of the speed of the vehicle 1 and the opening degree of the accelerator, calculating a target engine speed on the basis of the calculated target output and with reference to an optimum fuel curve, and carrying out a speed change operation in a manner to achieve the obtained target engine speed.

In addition, a transmission mechanism such as a torque converter having a lockup clutch may be arranged between the engine 8 and the transmission 13 according to need. An output shaft of the transmission 13 is connected with the rear wheels 3 via a differential gear 14 serving as a final reducing mechanism.

Here will be explained a steering mechanism 15 for changing an orientation of the front wheels 2. The steering mechanism 15 is comprised of: a steering wheel 16; a steering linkage 17 adapted to transmit a rotation of the steering wheel 16 to the front wheels 2; and an assist mechanism 18 adapted to assist a steering angle or a steering force of the steering wheel 16. The assist mechanism 18 is provided with a not shown actuator, and adapted to control an assisting amount of the actuator. Therefore, a ratio of the steering angle of the steering wheel 16 to an actual steering angle of the front wheels 2 can be approximated to one to one by reducing the assisting amount of the assist mechanism 18. As a result, the front wheels 2 can be turned directly in response to the rotation of the steering wheel 16 so that the sportiness of the vehicle 1 is enhanced.

Although not especially shown, in order to stabilize a behavior and attitude of the vehicle 1, the vehicle 1 is further provided with an antilock brake system (abbreviated as ABS), a traction control system, and a vehicle stability control system (abbreviated as VSC) for controlling those systems integrally. Those systems are known in the art, and configured to stabilize the behavior of the vehicle 1 by preventing a locking and slippage of the wheels 2 and 3. For this purpose, those systems are configured to control a braking force applied to the wheels 2 and 3 on the basis of a deviation between a vehicle speed and a wheel speed while controlling the engine torque. In addition, a navigation system for obtaining data on road information and a contemplated route (i.e., data on driving environment), and a mode selecting switch for selecting a driving mode manually from a sporty mode, a normal mode, an energy saving mode (i.e., economy mode) and so on, may be arranged in the vehicle 1. Further, a 4-wheel-drive mechanism (4WD) adapted to change the driving characteristics such as a hill-climbing ability, acceleration, a turning ability and so on may also be arranged in the vehicle 1.

In order to obtain data for controlling the engine 8, the transmission 13, the shock absorber 5 of the suspension 4, the assist mechanism 18, and the above-explained not shown systems, various kinds of sensors are arranged in the vehicle 1. For example, a wheel speed detection sensor 19 adapted to detect a rotational speed of each wheel 2 and 3, an accelerator sensor 20 adapted to detect an opening degree of the accelerator, a throttle sensor 21 adapted to detect an opening degree of the throttle valve 10, an engine speed sensor 22 adapted to detect a speed of the engine 8, an output speed sensor 23 adapted to detect an output speed of the transmission 13, a steering angle sensor 24, a longitudinal acceleration sensor 25 adapted to detect the longitudinal acceleration (Gx), a lateral acceleration sensor 26 adapted to detect the lateral (or transverse) acceleration (Gy), a yaw rate sensor 27 and so on are arranged in the vehicle 1. Here, acceleration sensors used in the above-explained behavior control systems such as the antilock brake system (ABS) and a vehicle stability control system (VSC) may be used as the acceleration sensors 25 and 26, and if an air-bag is arranged in the vehicle 1, acceleration sensors for controlling an actuation of the air-bag may also be used as the acceleration sensors 25 and 26. Detection signals (i.e., data) of those sensors 19 to 27 are transmitted to an electronic control unit (abbreviated as ECU) 28. The ECU 28 is configured to carry out a calculation on the basis of the data inputted thereto and data and programs stored in advance, and to output a calculation result to the above-explained systems or the actuators thereof in the form of a control command signal.

Here will be explained a driving "mode" according to the present invention. Specifically, the driving "mode" is an additional mode for controlling a vehicle behavior other than the control modes preinstalled at the designing or manufacturing phase, that is selected depending on a driving condition, or that is selected by a manual operation. For example, under the normal mode, fuel economy, quietness, acceleration are moderately adjusted. In turn, under the sporty mode, driving performance such as agility and acceleration are enhanced in comparison with those under the normal mode. In contrast, under the economy mode, fuel economy is enhanced. In order to establish the above-explained driving modes, a relation between an opening degree of the accelerator and an opening degree of the throttle valve 10 (or output of the prime mover) or a speed of the engine 8 (i.e., output characteristic), a relation between a vehicle speed or an opening degree of the accelerator and speed ratio (i.e., speed change characteristic), a relation between a vehicle speed or a steering angle and a steering assist amount (i.e., steering characteristic), and a relation between a height of the vehicle achieved by the suspension 4 and a damping force of the shock absorber 5 (i.e., a suspension characteristic), are adjusted under each driving mode. For example, under the sporty mode, the agility of the vehicle is enhanced. To this end, under the sporty mode, an output of the engine 8 is increased, a speed ratio is increased to increase a speed of the engine 8, a steering assist amount is reduced to enhance direct steering feeling, a damping force of the of the shock absorber 5 is increased to prevent depression of the vehicle body, and a suspension 4 is adjusted to lower the vehicle height. In contrast, under the economy mode, the characteristics to control the opening degree of the throttle valve 10 and the speed ratio are adjusted in a manner to enhance the fuel economy, the suspension characteristic is moderated to absorb vibrations of the vehicle body, and the steering assist amount is increased. In turn, under the normal mode, those characteristics are adjusted in a manner to moderate the vehicle behavior between the behavior under the sporty mode and the behavior under the economy mode.

The driving force control system of the present invention is configured to change a rotational speed of the prime mover in accordance with a vehicle speed and an index calculated on the basis of a behavior of the vehicle or calculated on the basis of an operation of the driver causing a behavioral change (e.g., an accelerating or a steering operation). According to the present invention, the index representing a driving preference or disposition (or intension) of a driver may be employed for the above-explained purposes. For example, a predetermined calculation value of acceleration or corrected acceleration, a predetermined calculation value calculated based on an opening degree or an operating speed of the accelerator, and a calculation value of a steering angle or a steering speed may be used as the index. Specifically, a command sportiness index (abbreviated as command SPI hereinafter) disclosed in above-explained PCT international publication WO2011/021634 is used in the present invention. Hereinafter, the command SPI will be explained in more detail.

Specifically, the command SPI is calculated based on a synthesized acceleration of a longitudinal acceleration and a lateral acceleration. Such synthesized acceleration represents "sportiness in each moment", therefore, the synthesized acceleration is used as an "instant SPI (i.e., an instant sportiness index)". Specifically, the instant SPI can be calculated by the following formula:

$$\text{Instant } SPI = (Gx^2 + Gy^2)^{1/2}$$

where "Gx" is a longitudinal acceleration, and "Gy" is a lateral acceleration.

Preferably, at least one of positive acceleration and negative acceleration (i.e., deceleration) of the longitudinal acceleration Gx is normalized to be used in the above formula. In case of driving the vehicle, an actual negative acceleration is larger than an actual positive acceleration. However, the driver cannot sense such difference between the actual negative acceleration and the actual positive acceleration in most cases. That is, the driver is basically unable to recognize the difference between the actual negative acceleration and the actual positive acceleration. Therefore, in order to correct a gap between the actual acceleration value and the acceleration perceived by the driver, the longitudinal acceleration Gx may be normalized by increasing the detected or calculated value of the positive acceleration, or by reducing the detected or calculated value of the negative acceleration (i.e., deceleration). Specifically, such normalization may be carried out by obtaining a ratio between maximum detected or calculated values of the positive acceleration and the negative acceleration, and multiplying the obtained ratio by the detected or calculated value of the positive or negative acceleration. Alternatively, a detected or calculated value of the negative acceleration value of the lateral acceleration Gy is corrected. For example, a longitudinal driving force and a lateral force generated by a tire can be indicated in a friction circle. Likewise, those normalization or weighting is a process to maintain maximum accelerations in each direction within a circle of predetermined radius by weighting at least one of the positive and negative acceleration values. As a result of such normalization and weighting, an influence of the positive acceleration and an influence of the negative acceleration on the control to change the driving characteristics of the vehicle are differentiated.

Thus, a degree of the gap between the actual acceleration value and the acceleration sensed by the driver differs depending on the direction of the acceleration. For example, the degree of the gap between the actual acceleration value and the acceleration sensed by the driver in the yawing direction of the vehicle is different from that in the rolling direction of the vehicle. Therefore, according to the vehicle control system of the present invention, a degree to reflect the acceleration on the control to change the driving characteristics of the vehicle, in other words, a degree to change the driving characteristics of the vehicle according to the acceleration can be differentiated depending on the direction of the acceleration.

Figure 12:
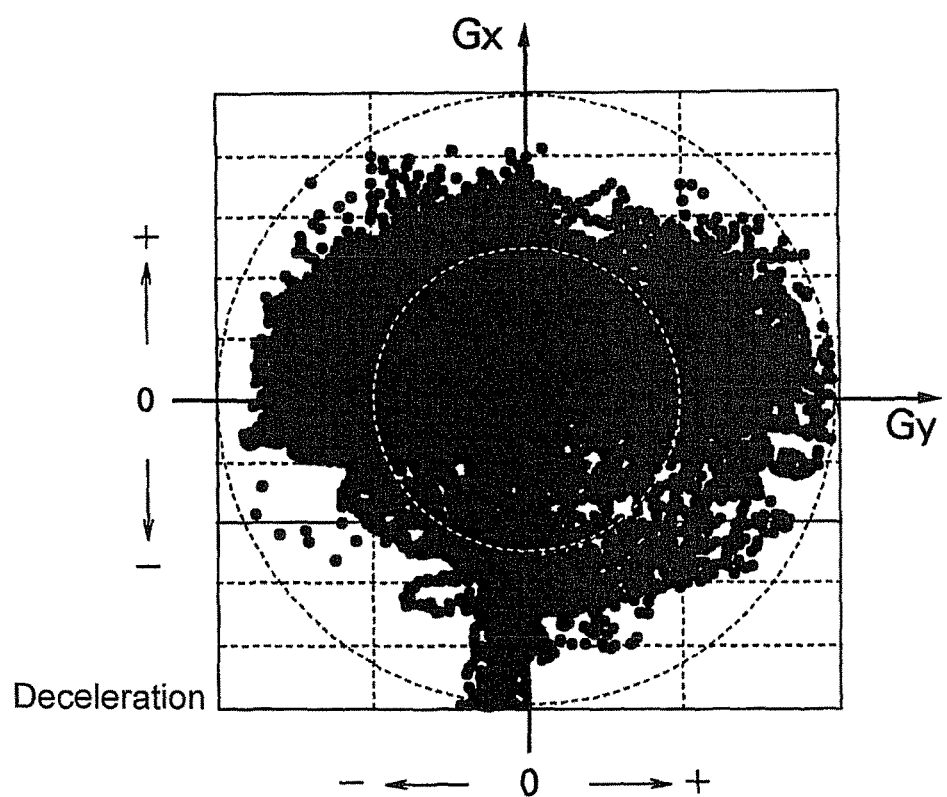
FIG. 12 is a friction circle plotting detected value of longitudinal acceleration and lateral acceleration.

FIG. 12 is a friction circle plotting sensor values of the lateral acceleration Gy and normalized values of the longitudinal acceleration Gx. Those values indicated in FIG. 12 were collected by driving the vehicle in a test course imitating ordinary roads. As can be seen from FIG. 12, the lateral acceleration Gy is not increased frequently in case of decelerating the vehicle significantly, but the lateral acceleration Gy tends to be generated generally within the friction circle.

Figure 13:
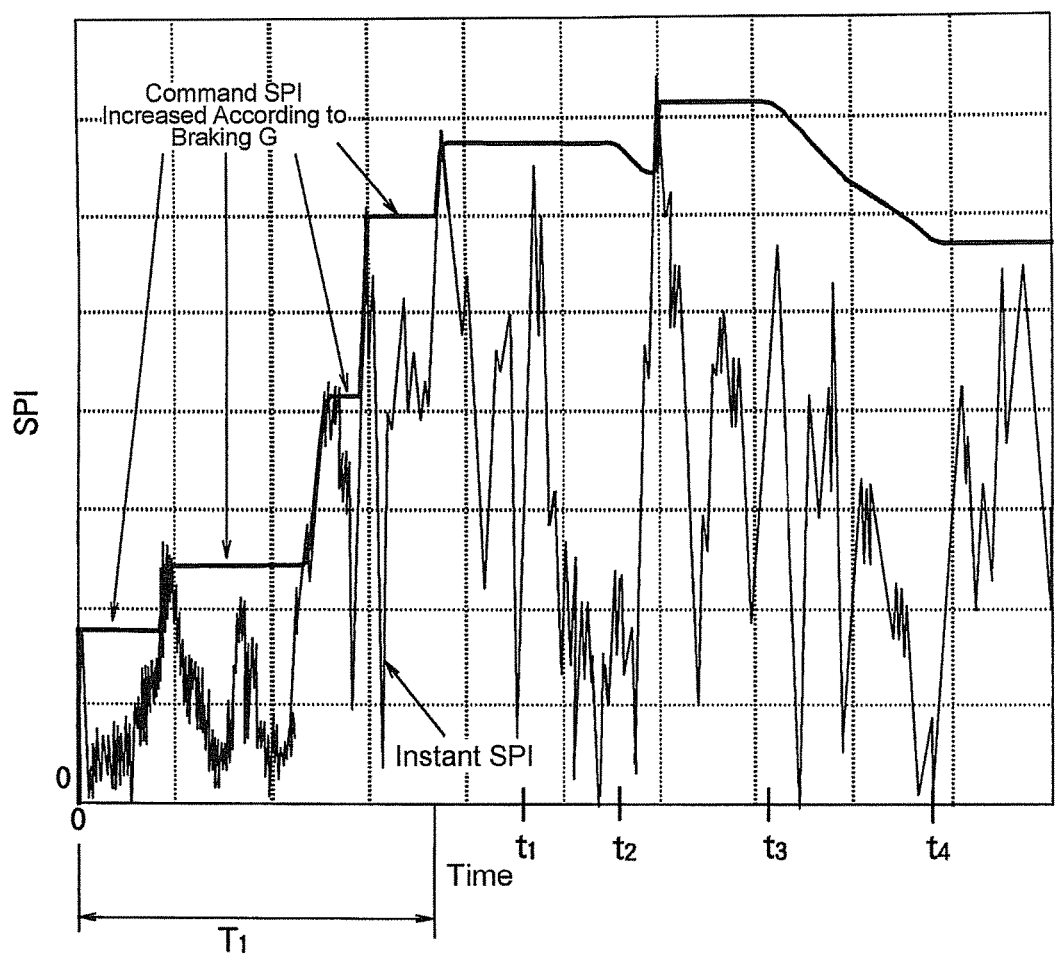
FIG. 13 is a graph indicating an example of a change in the command SPI according to a change in an instant SPI.

The command SPI to be used in the control for changing the driving characteristics of the vehicle is obtained based on the instant SPI thus calculated. The command SPI is increased immediately with an increase in the instant SPI, but lowered after a delay with respect to a drop in the instant SPI. Specifically, the command SPI is lowered based on a satisfaction of a specific condition. FIG. 13 is a graph indicating the command SPI being changed according to a fluctuation in the instant SPI changed by an abrupt braking (i.e., by braking G). Specifically, the instant SPI shown in FIG. 13 corresponds to the plotted values indicated in FIG. 12. Meanwhile, the command SPI is set on the basis of a local maximum value of the instant SPI, and the command SPI is maintained until a satisfaction of a predetermined condition. Thus, the command SPI is increased promptly but lowered relatively slower.

As indicated in FIG. 13, during a period T1 from a commencement of the control, the instant SPI is fluctuated according to a change in the acceleration of the vehicle. Specifically, the instant SPI being fluctuated is increased locally to a maximum value prior to a satisfaction of the predetermined condition to update the command SPI. In this situation, the command SPI is set on the basis of each local maximum value of the instant SPI. Therefore, the command SPI is increased stepwise during the period T1. Then, when the condition to lower the command SPI is satisfied at a time point t2 or t3, the command SPI is started to be lowered. That is, the command SPI is lowered under the situation that maintaining the previous large value of the command SPI is undesirable. Specifically, according to the present invention, such condition to lower the command SPI is satisfied according to an elapsed time.

More specifically, the above-mentioned condition in that "maintaining the previous large value of the command SPI is undesirable" is a situation in which a divergence between the command SPI being maintained to the current value and the current instant SPI is relatively large and such divergence between the indexes is being accumulated continuingly. For example, the command SPI will not be lowered even if the instant SPI is lowered instantaneously in case the accelerator pedal 12 is returned temporarily without intension to decelerate the vehicle by the driver's tendency. However, in case the instant SPI keeps fluctuating below the command SPI for a certain period of time, the aforementioned condition to lower the command SPI is satisfied. Thus, the length of time in which the instant SPI stays below the command SPI may be used as the condition to lower (or alter) the command SPI. In order to reflect the actual driving condition of the vehicle more accurately on the command SPI, a temporal integration (or accumulation) of the deviation between the command SPI being maintained and the instant SPI may be used as the condition to lower the command SPI. In this case, the command SPI is lowered when the temporal integration of the deviation between those indexes reaches a predetermined threshold value. To this end, this threshold value may be determined arbitrarily on the basis of a driving test or simulation. In case of using the temporal integration as the condition to lower the command SPI, the command SPI is to be lowered taking into consideration a duration time of the divergence of the instant SPI from the command SPI, in addition to the deviation between the command SPI and the instant SPI. In this case, therefore, the actual driving condition or behavior of the vehicle can be reflected on the control to change the driving characteristics of the vehicle more accurately.

In the example shown in FIG. 13, a length of time to maintain the command SPI before the time point t2 is longer than a length of time to maintain the command SPI before the time point t3. Those lengths of times to maintain the command SPI are determined by a control to be explained hereinafter. Specifically, as indicated in FIG. 13, the command SPI is increased to a predetermined value at the end of the aforementioned period T1 and maintained. In this situation, the instant SPI rises instantaneously at the time point t1 before the time point t2 at which the condition to lower the command SPI is to be satisfied. Therefore, an integral of the deviation between the command SPI and the instant SPI in this situation is smaller than a predetermined value, and the command SPI is maintained to the time point t2. Here, this predetermined value to lower the command SPI may be set arbitrarily on the basis of a driving test or simulation while taking into consideration a calculation error of the instant SPI. In case the instant SPI is thus raised close to the command SPI, this means that the actual driving condition of the vehicle at this time point is similar to the accelerating and turning conditions represented by the instant SPI upon which the current command SPI being maintained is based. That is, although a certain period of time has elapsed from the time point at which the current command SPI being held was set, the actual driving condition of the vehicle is still similar to the condition at the time point when the current command SPI being maintained was set. Therefore, in this situation, a commencement to lower the command SPI is delayed even if the instant SPI is fluctuating below the current command SPI being maintained. For example, the commencement to lower the command SPI can be delayed by resetting the elapsed time (i.e., accumulation time) or the integral of deviation from the time point at which the current command SPI out was set, and restarting the accumulation of the elapsed time or the integration of the deviation. Alternatively, the commencement to lower the command SPI may also be delayed by subtracting a predetermined value from the elapsed time of the command SPI or the integral of deviation between the command SPI and the instant SPI, or by interrupting the accumulation of the elapsed time or the integration of the deviation for a predetermined period of time.

Figure 14:
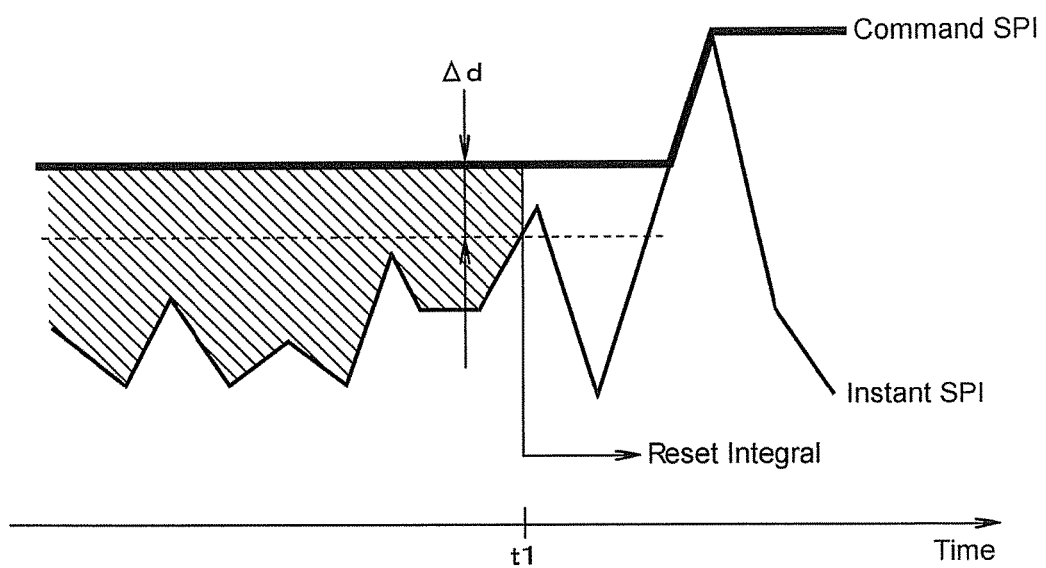
FIG. 14 is a graph indicating the integral of the deviation between the command SPI and the instant SPI, and a reset of the integral.

FIG. 14 is a graph indicating the aforementioned integral of the deviation between the command SPI and the instant SPI, and the reset of the integral. In FIG. 14, a shadowed area corresponds to the integral of the deviation between the command SPI and the instant SPI. In the example indicated in FIG. 14, the reset of the integral of the deviation is executed at a time point t11 at which the divergence between the command SPI and the instant SPI becomes smaller than a predetermined value $\Delta d$, and the integration of the deviation between the command SPI and the instant SPI is restarted from the time point t11. Consequently, the condition to lower the command the command SPI and the instant SPI is prevented from being satisfied at the time point t11 so that the command SPI is maintained to the previous value. Then, when the instant SPI exceeds the command SPI after restarting the integration of the deviation therebetween, the command SPI is updated to the new local maximum value of the instant SPI and maintained.

Figure 1:
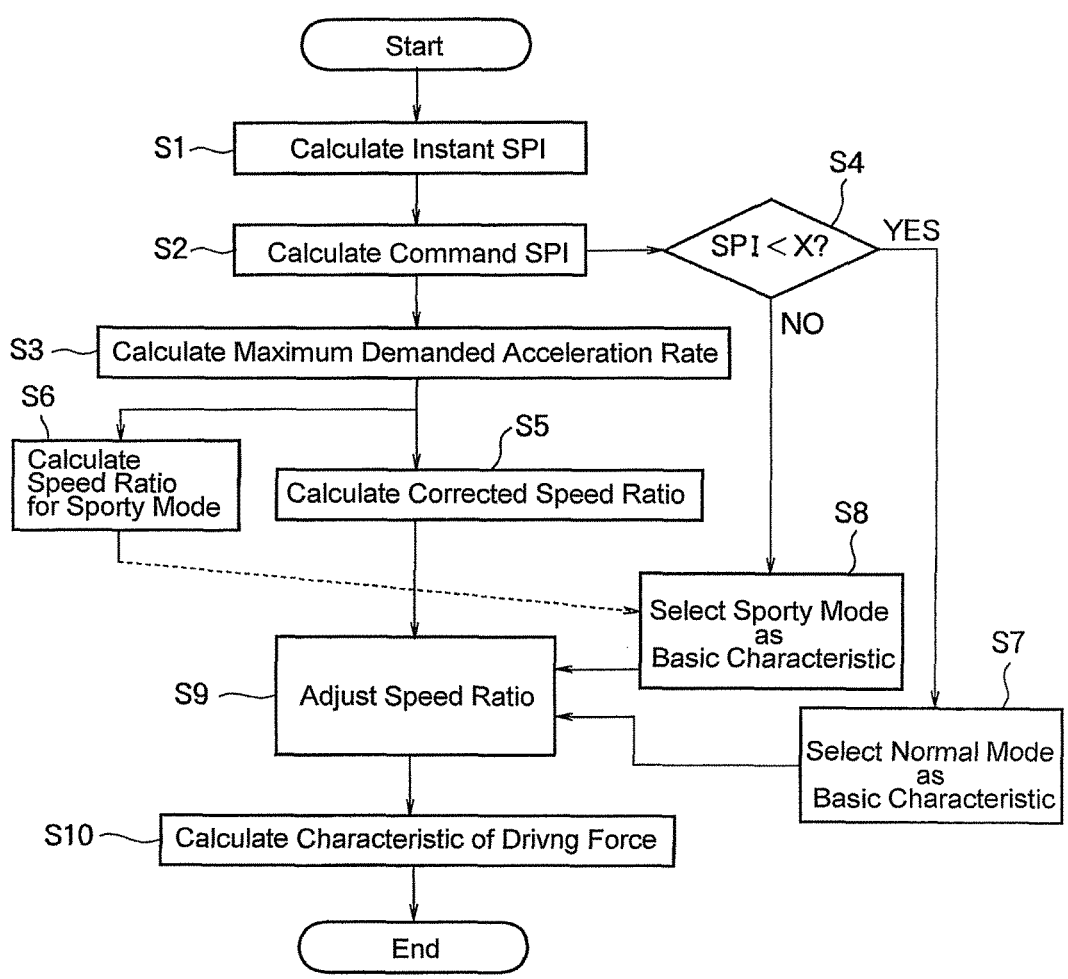
FIG. 1 is a flowchart explaining a control example to be carried out by the driving force control system of the present invention.

Next, here will be explained a preferred control example to be carried out by the diving force control system of the present invention using the above-explained command SPI. Referring now to FIG. 1, there is shown a flowchart for explaining a control example carried out under the condition that the driving force control system of the present invention is applied to the vehicle which is comprised of a belt-driven or toroidal continuously variable transmission, and in which the driving mode can be selected from the normal mode (or manual mode) and the sporty mode. First of all, the instant SPI is calculated based on the current running condition or based on a detection value of the acceleration sensor (at step S1), and the command SPI is calculated based on the instant SPI thus calculated (at step S2). Those instant SPI and command SPI are calculated by the foregoing procedures. Then, a maximum demanded acceleration rate is calculated using the command SPI (at step S3), and in parallel therewith, it is determined whether or not the command SPI thus calculated is smaller than a predetermined threshold value X (at step S4).

Figure 2:
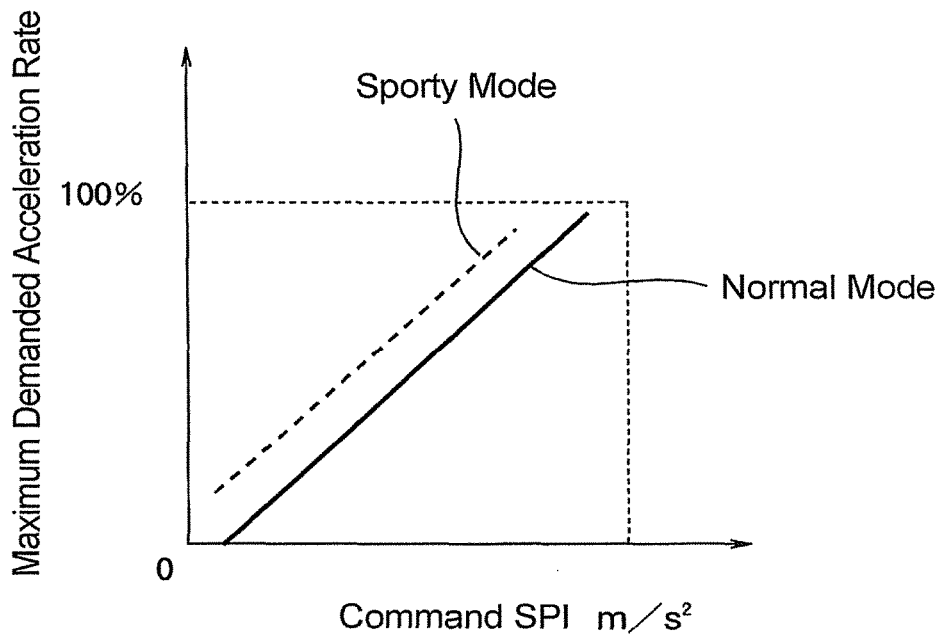
FIG. 2 is a map showing a relation between the command SPI and a maximum demanded acceleration rate.

An example to obtain the maximum demanded acceleration rate is shown in FIG. 2. Specifically, the maximum demanded acceleration rate represents an available driving force capacity of the vehicle. For example, in case the maximum demanded acceleration rate is 100%, the vehicle is in condition to produce maximum possible acceleration. In this situation, meanwhile, the transmission 13 is in condition to establish a speed ratio to raise the engine speed to the maximum speed, or to establish the largest speed ratio (i.e., the speed ratio of the lowest speed side). In case the maximum demanded acceleration rate is 50%, the vehicle is in condition to produce half of available acceleration thereof, and the transmission 13 is in condition to establish an intermediate speed ratio. As indicated in the example shown in FIG. 2, the maximum demanded acceleration rate is increased according to an increase in the command SPI. In FIG. 2, the basic characteristic of the vehicle is indicated by a solid line. The basic characteristic of the vehicle indicated in FIG. 2 was obtained by calculating a relation between the command SPI and the maximum demanded acceleration rate on the basis of data obtained from a driving test of the vehicle, while making appropriate corrections on the basis of the driving test and a simulation of driving the vehicle. In case of setting a characteristic line in a region where the maximum demanded acceleration rate is higher than the basic characteristics, the acceleration of the vehicle is increased relatively. In this case, therefore, the acceleration of the vehicle is increased so that the sportiness of the driving characteristics is enhanced. By contrast, in case of setting the characteristic line in a region where the maximum demanded acceleration rate is lower than the basic characteristics, the acceleration of the vehicle is decreased relatively. In this case, therefore, the driving characteristics and acceleration of the vehicle are moderated so that the riding comfort of the vehicle is improved.

Then, a corrected speed ratio is calculated using the maximum demanded acceleration rate thus calculated (at step S5). Specifically, a speed ratio (or a target engine speed) obtained by a basic speed change control of the vehicle to which the invention is applied is corrected based on the command SPI. To this end, for example, a correction amount of the speed ratio in accordance with the maximum demanded acceleration rate is determined in advance, and the correction amount of the speed ratio is obtained using the maximum demanded acceleration rate calculated at step S3 as a parameter.

Figure 3:
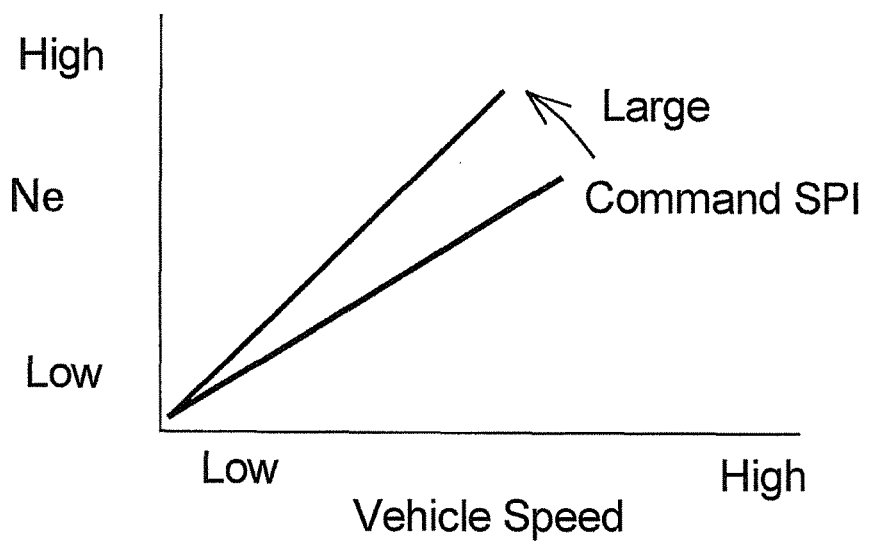
FIG. 3 is a graph showing one example of basic characteristics of an engine speed and a vehicle speed under the sports mode.

While at the same time, a speed ratio for the sporty mode is calculated (at step S6). The speed ratio for the sporty mode is indicated in FIG. 3 as a relation of the engine speed Ne to the vehicle speed. Specifically, FIG. 3 is a graph where the horizontal axis represents the vehicle speed and the longitudinal axis represents the engine speed Ne, and the speed ratio is indicated as a straight diagonal line extending from the original point. As can be seen, the engine speed Ne is increased in proportion to an increase in the vehicle speed, and according to the driving force control system of the present invention, the relation between the engine speed Ne and the vehicle speed can be selected from a plurality of such diagonal lines having different gradients. Therefore, when the speed ratio or the gear stage is changed, the relation between the engine speed Ne and the vehicle speed is altered as represented by another diagonal line. In addition, when the command SPI is changed under the sporty mode, such relation between the engine speed Ne and the vehicle speed is shifted to another diagonal line as a result of the change in the command SPI, even if the speed ratio or the gear stage governed by the relation between the vehicle speed and the drive demand (e.g., opening degree of the accelerator) is not changed. Specifically, as can be seen from FIG. 3, the relation between the engine speed Ne and the vehicle speed is shifted to another diagonal line of steeper gradient when the command SPI is changed in the direction to enhance the agility of the vehicle (i.e., increased). Thus, although the shift diagram (i.e., a speed change map) is not altered, the above-explained control is substantially a speed change control. For example, the above-explained control is carried out by correcting input data for determining the speed ratio, or correcting a command value for setting the speed ratio.

Hereinafter, the above-explained speed ratio for the sporty mode, and the speed change control based on the speed ratio for the sporty mode will be explained in more detail. Under the sporty mode, specifically, a speed change control for changing the speed ratio stepwise is carried out with reference to the above-explained speed change diagram determining the speed ratio. In the vehicle in which the above-explained speed change control is carried out, the maximum possible acceleration to be generated (i.e., the acceleration rate is 100%) under each speed ratio (or gear stage) is determined with respect to the vehicle speed. Accordingly, the acceleration can be obtained with reference to the map shown in FIG. 4 using the maximum demanded acceleration rate and the vehicle speed as parameters. However, the acceleration thus obtained may be achieved by different speed ratios (or gear stages). In such case, the speed ratio (or gear stage) that can achieve the engine speed Ne smaller than an upper limit speed thereof determined based on the maximum demanded acceleration rate for each speed ratio (or gear stage) but closest to the upper limit speed is selected. Specifically, as can be seen from FIG. 4, the engine speed Ne is increased with an increase in the vehicle speed, and when the engine speed Ne reaches the upper limit speed of the current speed ratio, an upshifting is carried out so that the engine speed Ne is lowered temporarily. Then, the engine speed Ne is increased again with an increase in the vehicle speed until reaching the upper limit speed of the current speed ratio. That is, the speed ratio is maintained within a predetermined range of the vehicle speed, and the engine speed Ne is increased with an increase in the vehicle speed during a period of maintaining the speed ratio. Therefore, the driver is allowed to feel the acceleration by sounds and vibrations resulting from thus increasing the engine speed Ne. Thus, according to the driving force control system of the present invention, the driver is allowed to drive the vehicle with a pleasurable feeling without feeling a delay in augmentation of the vehicle speed behind an augmentation of the engine speed.

Figure 4:
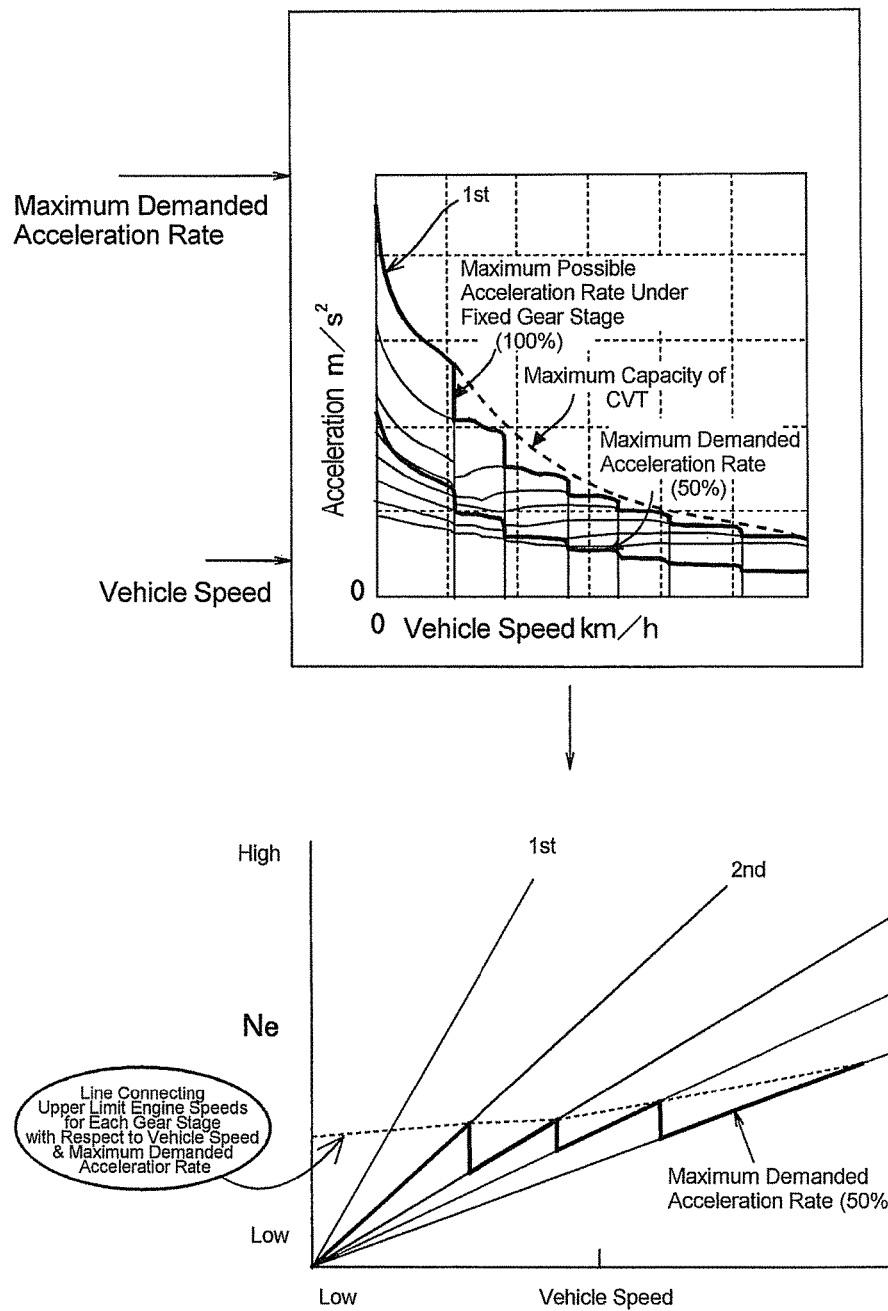
FIG. 4 shows one example of a map for determining the acceleration based on a maximum demanded acceleration rate and a vehicle speed, and one example of a map for determining an engine speed to achieve the determined acceleration.

In the example shown in FIG. 4, the engine speed Ne to cause the speed change operation is set to the higher speed as the vehicle speed increases (i.e., for the higher gear stage), as indicated by the broken line connecting the points at which the speed change operation is caused. In addition, such engine speed to cause the speed change operation is also set to the higher value with an increase in the command SPI. Therefore, the engine speed is raised in accordance with an increase in the command SPI.

Figure 5:
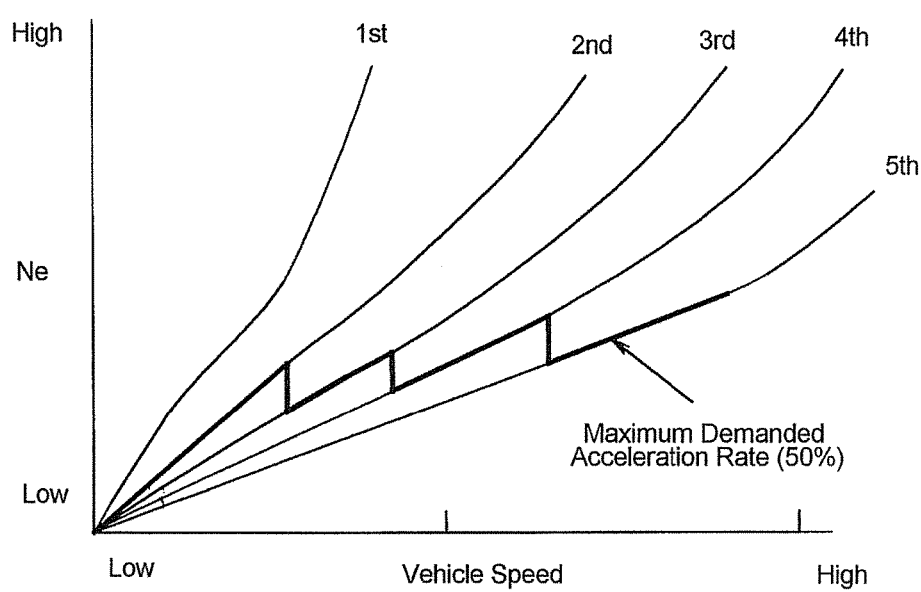
FIG. 5 shows another example of a map determining a relation between a vehicle speed and the engine speed used in the vehicle which has a transmission for changing a speed ratio stepwise, and to which the present invention is applied.

Thus, according to the present invention, the speed ratio is controlled in a manner such that the engine speed Ne is increased in proportion to an increase in the vehicle speed. Alternatively, in order to reduce deficiency and excess of the driving torque with respect to the vehicle speed, the driving control system may also be configured to control the speed ratio in a manner such that the engine speed Ne is increased in quadratic manner with respect to an increase in the vehicle speed. An example of such relation between the vehicle speed and the engine speed Ne is shown in FIG. 5.

As described, the command SPI calculated at step S2 is compared with the threshold value X at step S4. That is, the threshold X is a criterion to select the driving mode. According to the present invention, the threshold X is determined by the following procedures.

As mentioned above, the command SPI is an index representing driver's preference that is calculated based on the acceleration. That is, the command SPI is substantially an absolute value of the synthesized acceleration. Therefore, if the command SPI is set to a large value, the characteristics of the output and the speed ratio etc. are adjusted in a manner such that the agility of the vehicle behavior is enhanced. For example, an opening degree of the throttle valve 10 or an output torque with respect to a predetermined opening degree of the accelerator is increased, and a speed ratio is increased to a low speed side (i.e., to a relatively large ratio) to increase the driving force. Thus, those characteristics are altered to enhance the sportiness of the vehicle behavior. Therefore, if the command SPI is increased, the acceleration of the vehicle is increased according to the drive demand such as an opening degree of the accelerator. Specifically, provided that the vehicle is an engine driven automobile, a control for raising the lower limit of the engine speed is carried out so as to thus increase the acceleration or generate a larger driving force. However, even if the acceleration is changed to comply with the driver's demand, the driver is able to sense a change in the acceleration linearly only within a certain range. If the acceleration is changed beyond such range, it would become difficult for the driver to sense a magnitude of acceleration. In this situation, therefore, it would be difficult for the driver to sense the change in the acceleration linearly from the beginning of the change in the acceleration. As a result, the driver may feel a gap between the actual accelerating operation and the sensed change in the acceleration. In addition, in case the vehicle speed is increased, an available acceleration to the maximum possible acceleration is rather small. In this case, therefore, it would be difficult to increase acceleration even if the accelerating operation is carried out.

The above-explained threshold value X is a criterion for selecting the driving mode, that is, to shift the driving mode to the normal mode or to the sporty mode. In other words, the threshold value X is a criterion for determining a value of the command SPI. As described, the command SPI is obtained based on the synthesized acceleration, and the synthesized acceleration is increased if the longitudinal or the lateral acceleration is increased by any of a steering operation, accelerating operation and a braking operation, even if the operation is temporal. That is, the command SPI is increased when the steering wheel, the accelerator pedal 12 or the brake pedal 7 is operated significantly even if such operation is not especially intended to enhance the agility (i.e., sportiness) of the vehicle, for example, even if such operation is carried out to dodge an obstacle, or carried out due to negligence. Therefore, if the threshold value X as a criterion of the command SPI is too small, a determination to shift to the sporty mode would be satisfied easily. Consequently, the driving mode of the vehicle would be shifted to the sporty mode frequently against the driver's intention. In order to avoid such a disadvantage, it is preferable to set the threshold value X within a predetermined range smaller than 4.5 m/s². Meanwhile, a lower limit value of the threshold value X is determined in a manner such that the driving mode will not be shifted automatically to the sporty mode frequently. To this end, the lower limit value of the threshold value X is determined based on a result of experimentation or simulation. According to the present invention, the lower limit value of the threshold value X is set to 3.5 m/s². Such actual value of the threshold X was determined based on the in-vehicle research conducted by the inventors of the present invention.

Referring back to FIG. 1, if a value of the command SPI is smaller than the threshold value X so that the answer of step S4 is YES, the normal mode is selected as a basic characteristic (at step S7). In contrast, if a value of the command SPI is larger than the threshold value X so that the answer of step S4 is NO, the sporty mode is selected as the basic characteristic (at step S8). Thus, when the command SPI is increased to exceed the threshold value X, the sporty mode is selected. Then, when the command SPI is lowered to be smaller than the threshold value X, the driving mode is shifted to the normal mode again. As described, those driving modes govern the driving characteristics or the control characteristics of the vehicle. Specifically, under the normal mode, the vehicle having the continuously variable speed change function is controlled to change the speed ratio stepwise, in a manner to achieve the fuel economy and the quietness as designed or planned. Meanwhile, under the sporty mode, the agility of the vehicle is enhanced in comparison with that under the normal mode. Here, the agility under the normal mode of sports cars and grand touring cars is enhanced in comparison with that under the normal mode of family cars and luxury cars. In addition, according to the present invention, the driving mode such as the normal mode and the sporty mode can be selected not only automatically based on the index but also manually by a switching operation of the driver.

The control characteristics to be adjusted under each driving mode include an output characteristic of the engine 8, a speed change characteristic, a steering characteristic, a suspension characteristic and so on. With respect to the output characteristic, under the sporty mode, a relation between an opening degree of the accelerator and an opening degree of the throttle valve 10 or an injection quantity of the fuel is set to a proportional relation that can be expressed by a straight line or a substantially straight line. In contrast, under the normal mode, the relation between an opening degree of the accelerator and an opening degree of the throttle valve 10 or an injection quantity of the fuel is set to a relation that can be expressed by a quadratic curve. Therefore, under the sporty mode, the output of the engine 8 can be controlled sensitively in accordance with a change in the opening degree of the accelerator. In contrast, under the normal mode, a change in the output of the engine 8 with respect to a change in the opening degree of the accelerator is reduced within a region where the opening degree of the accelerator is small. With respect to the speed change characteristic, under the sporty mode, a relatively large speed ratio is established even if the vehicle is running at a high speed, that is, the speed ratio is controlled in a manner such that the engine speed is increased. In contrast, under the normal mode, the speed ratio is reduced in comparison with that under the sporty mode, that is, the speed ratio is controlled in a manner such that the engine speed is lowered.

As described, in case the command SPI is larger than the threshold X so that the answer of step S4 is NO, the sporty mode is selected at step S8 as the basic characteristic. In this case, the speed ratio is controlled based on the speed ratio for the sporty mode as explained with reference to FIGS. 3 to 5. Specifically, the speed ratio is determined based on the command SPI and the vehicle speed, and the engine speed is increased with an increase in the vehicle speed.

Figure 6:
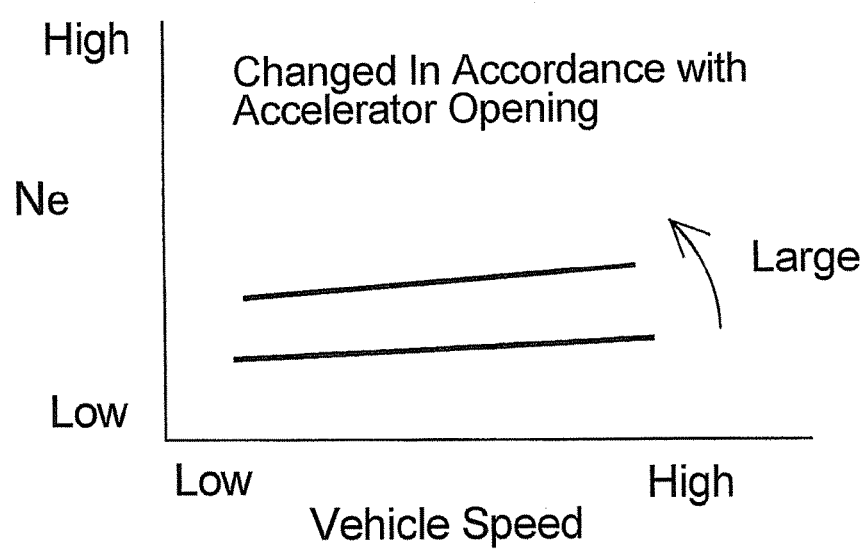
FIG. 6 is a graph showing one example of basic characteristics of an engine speed and a vehicle speed under the normal mode (or manual mode).

To the contrary, in case the command SPI is smaller than the threshold X so that the answer of step S4 is YES, the normal mode is selected at step S7 as the basic characteristic. In this case, the engine speed Ne is controlled as indicated in FIG. 6. In other words, the speed ratio is controlled in a manner to achieve a relation of the engine speed Ne to the vehicle speed as indicated in FIG. 6. In the graph shown in FIG. 6, the horizontal axis also represents the vehicle speed and the longitudinal axis represents the engine speed Ne. As can be seen, a gradient of the diagonal line representing the relation between the engine speed Ne and the vehicle speed under the normal mode is rather gentle so that the diagonal line extends almost in parallel with the horizontal axis. In this case, therefore, the diagonal line does not pass through the original point of the graph. That is, under the normal mode, the engine speed Ne is controlled in a manner not to be changed as much as possible. Specifically, the engine speed Ne is controlled to the speed at which the required power can be achieved while optimizing the fuel economy. Accordingly, such diagonal line representing the relation between the engine speed Ne and the vehicle speed is shifted to another diagonal line in accordance with a change in the opening degree of the accelerator. In other words, although the engine speed Ne is changed in accordance with a change in the vehicle speed or the opening degree of the accelerator under the normal mode, the engine speed Ne will not be changed even if the command SPI is changed. That is, under the normal mode, the relation between the engine speed Ne and the vehicle speed is shifted by carrying out the speed change operation to the relation represented by another diagonal line, as the normal speed change control of a normal automatic transmission.

As to the steering characteristic, under the sporty mode, a steering assist amount is reduced to enhance the so-called "direct steering feel". In contrast, under the normal mode, the steering assist amount is increased in comparison with that under the sporty mode. In turn, with respect to the suspension characteristic, under the sporty mode, a damping force of the shock absorber is increased to reduce a rolling motion and a squat motion of the vehicle. In addition, the vehicle height is lowered. In contrast, under the normal mode, the damping force of the shock absorber is reduced to enhance shock absorbability. In addition, the vehicle height is raised.

Those control characteristics are preinstalled individually for the normal mode and the sporty mode (as a unit) so that the control characteristics is switched depending on the selected driving mode. Specifically, a control map or a control gain is altered. Alternatively, detected data or control data calculated based on the detected data is corrected, otherwise, a coefficient for the correction is changed.

Thus, the corrected speed ratio is calculated at step S5, and the speed ratio for the normal mode is calculated at step S7 or the speed ratio for the sporty mode is calculated at step S8. Then, a control for adjusting the speed ratio is carried out (at step S9). Specifically, such "adjustment control" is carried out to select the speed ratio that can achieve the highest engine speed Ne out of available engine speed. As described, the speed ratio, the gear stage or the engine speed Ne is calculated based on the maximum demanded acceleration rate. However, the corrected speed ratio may be larger than the speed ratio calculated for the normal mode or the sporty mode in some cases. Therefore, at step S9, the larger speed ratio is selected at step S9. Here, according to the present invention, the adjustment control is not necessarily to be carried out.

Then, characteristic of driving force is calculated (at step S10). Specifically, the characteristic of driving force is changed in accordance with the calculation result by controlling the actuators for controlling characteristics of the throttle valve 10, the speed ratio of the transmission 13 and so on. Basically, those control characteristics are changed in a manner such that the agility of the vehicle is enhanced to achieve a sporty running, in accordance with an increase in the command SPI.

Thus, the driving force control system of the present invention is applied to the vehicle in which the speed ratio is changed continuously, and configured to carry out the control as explained above. Therefore, the speed ratio is kept to a constant value with respect to the vehicle speed and the command SPI within a predetermined range of the vehicle speed, and the engine speed is restricted to the speed determined by the speed ratio being kept. That is, when the acceleration is demanded, the upper limit speed of the engine is restricted to the speed to be achieved by the current speed ratio. Likewise, when the decelerating operation is carried out, the lower limit value of the engine speed is restricted to the speed to be achieved by the current speed ratio. In addition, the engine speed Ne is not only changed in accordance with the vehicle speed but also changed in accordance with the command SPI as long as the speed ratio is maintained. Therefore, when the driver carries out an accelerating or decelerating operation, the engine speed Ne is changed in accordance with a change in the acceleration resulting from the operation of the driver. For this reason, the driver is allowed to feel a change in the behavior of the vehicle from a change in the vibrations and sounds (i.e., stimuli). As a result, a gap between the operation and the change in the behavior of the vehicle is eliminated so that the driver is allowed to drive the vehicle with a pleasurable feeling. Especially, provided that the sporty mode is selected to enhance the agility of the vehicle, the engine speed Ne is still allowed to be changed by carrying out an accelerating operation even if the engine speed Ne is kept to the relatively high speed. Therefore, the sportiness of the vehicle is enhanced.

Additionally, in the control for thus changing the speed ratio stepwise, it is possible to set the engine speed Ne to cause the speed change operation to the higher speed at the higher vehicle speed, that is, in accordance with an increase in the command SPI. As described, the command SPI is increased with an increase in the acceleration, and in this case, the upshifting is to be carried out at higher engine speed if the vehicle speed is high. Therefore, the driver is allowed to drive the vehicle without feeling a delay in augmentation of the vehicle speed behind an augmentation of the engine speed. That is, the driver's intention is reflected on the drive feeling as intended so that the driver is allowed to drive the vehicle with a pleasurable feeling.

Figure 7:
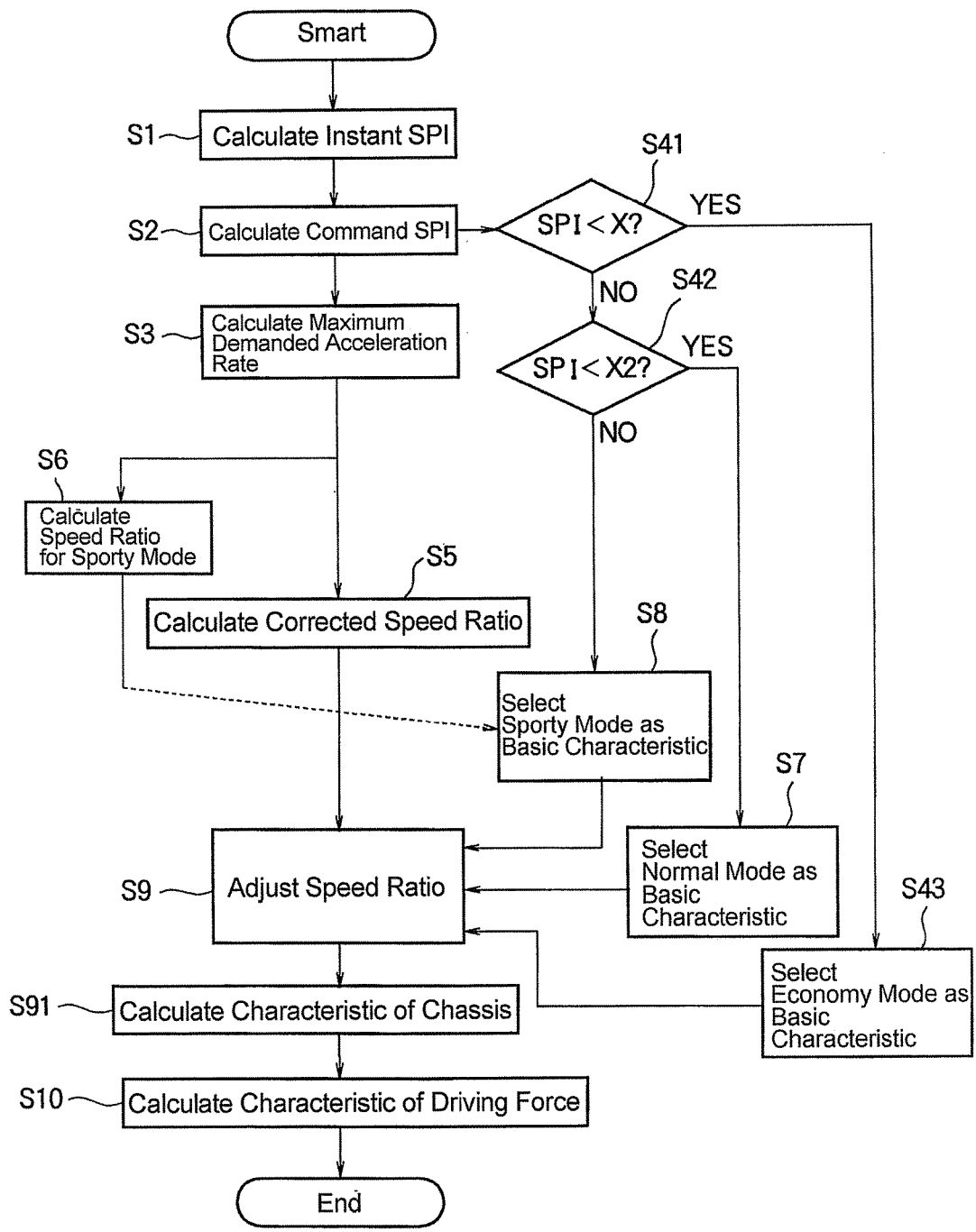
FIG. 7 is a flowchart explaining another control example to be carried out by the driving force control system of the present invention.

In the foregoing example, the detection values of the sensors are employed as the longitudinal acceleration Gx and the lateral acceleration Gy. However, since the acceleration is changed according to an operation of the driver, the longitudinal acceleration Gx and the lateral acceleration Gy may also be calculated based on the operating amount of the driver. In addition, according to the present invention, the control mode (i.e., the drive mode) may be selected from more than three modes. Specifically, an economy mode where the fuel economy is further improved in comparison with that under the normal mode may also be selected. Referring now to FIG. 7, there is shown a flowchart explaining an example of the driving force control system allowed to select the economy mode in addition to the normal mode and the sporty mode. In the example shown in FIG. 7, the drive mode is selected from the sporty mode, the normal mode and the economy mode depending on the comparison result of the command SPI with a lower limit threshold X1 and an upper limit threshold X2.

As the example shown in FIG. 1, the instant SPI is calculated (at step S1), and the command SPI is calculated (at step S2). Then, a maximum demanded acceleration rate is calculated using the command SPI (at step S3). After that, a corrected speed ratio is calculated using the maximum demanded acceleration rate thus calculated (at step S5), and a speed ratio for the sporty mode is calculated (at step S6). The controls of steps S5 and S6 are carried out by the procedures as explained with reference to FIG. 1. While at the same time, it is determined whether or not the command SPI is smaller than the lower limit threshold X1 (at step S41). The lower limit threshold X1 is a minimum value of the acceleration that allows the driver in a normal driving posture to sense a change in the acceleration from zero, or a parameter such as an opening degree of the accelerator corresponding to said minimum value of the acceleration. For example, in case the vehicle is running at low speed in an urban area, such minimum value of the acceleration is within a range of 1.0 m/s$^2$ to 1.5 m/s$^2$. In addition, the lower limit threshold value X1 may be changed depending on a structure or grade of the vehicle. If the command SPI is larger than the lower limit threshold value X1 so that the answer of step S41 is NO, it is determined whether or not the command SPI is smaller than the upper limit threshold X2 (>X1) (at step S42). The upper limit threshold X2 is a maximum value of the acceleration that allows the driver having an ordinary sensitivity in a normal driving posture to sense a linear change in the acceleration from substantially zero, or a parameter such as an opening degree of the accelerator corresponding to said maximum value of the acceleration. Such maximum value of the acceleration is within a range of 3.5 m/s$^2$ to 4.5 m/s$^2$ irrespective of the vehicle speed. Accordingly, the upper limit threshold value X2 is determined based on an experimental result or the like, and depending on a structure or grade of the vehicle.

If the command SPI is smaller than the upper limit threshold X2 so that the answer of step S42 is YES, the normal mode is selected as the basic characteristic (at step S7). By contrast, if the command SPI is larger than the upper limit threshold X2 so that the answer of step S42 is NO, the sporty mode is selected as the basic characteristic (at step S8). That is, the controls similar to those of foregoing steps S7 and S8 shown in FIG. 1 are carried out.

Meanwhile, if the command SPI is smaller than the lower limit threshold X1 so that the answer of step S41 is YES, the economy mode is selected as the basic characteristic (at step S43). As described, the controls for improving the fuel economy are carried out under the economy mode. To this end, under the economy mode, the driving force is reduced or changed in a mild manner, and in connection with such reduction in the driving force, the vehicle is basically driven with a smaller speed ratio. In addition, the damping force of the shock absorber is reduced, the vehicle height is raised, and the steering assist amount is increased. Here, such control characteristics are also preinstalled.

Then, the adjustment of the speed ratio is carried out (at step S9). Specifically, as the step S9 in FIG. 1, the speed ratio for the normal mode calculated at step S7, the speed ratio for the sporty mode calculated at step S8, or the speed ratio for the economy mode calculated at step S4 is compared with the speed ratio corrected at step S5, and the larger speed ratio is selected.

After that, a characteristic of chassis is calculated (at step S91), and a characteristic of driving force is calculated (at step S10). Specifically, those characteristics are changed in accordance with the calculation result by controlling the actuators for controlling characteristics of the throttle valve 10, the speed ratio of the transmission 13, the damping force of the shock absorber 5 of the suspension 4, the assisting force of the assist mechanism 18 and so on. Basically, those control characteristics are changed in a manner such that the agility of the vehicle is enhanced to achieve a sporty running, in accordance with an increase in the command SPI. Specifically, those characteristics are changed in a manner such that quick acceleration is achieved by generating a large driving force, that a depression or bounce of the vehicle body is reduced by sustaining the vehicle body firmly, and that the direct steering feeling is achieved by reducing the assisting amount of the steering operation. A basic characteristic of the chassis and a basic characteristic of the driving force are also preinstalled individually for each driving mode such as the normal mode, the sporty mode and the economy mode. Therefore, the assisting amount of the steering operation, the damping force of the shock absorber, and the opening degree of the throttle valve 10 with respect to the opening degree of the accelerator are individually controlled depending on the basic characteristic for the selected driving mode, and the control amounts thereof are individually corrected in accordance with the command SPI within the range of the selected basic characteristic.

Figure 8:
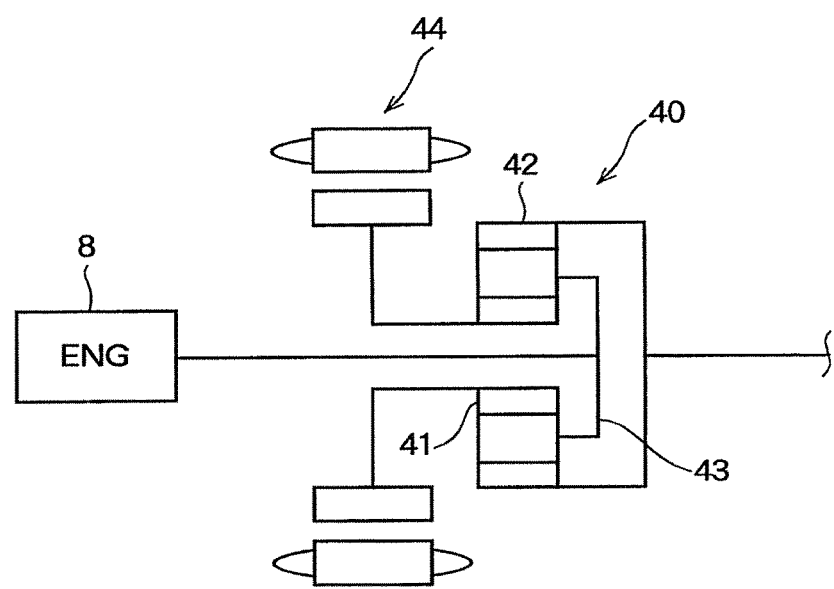
FIG. 8 is a view schematically showing one example of a hybrid mechanism.

As the vehicle having the belt-driven or toroidal continuously variable transmission, a speed ratio of the hybrid vehicle having an engine and a motor may also be varied continuously by controlling an engine speed by the motor. One example of the hybrid structure is shown in FIG. 8. In the example shown in FIG. 8, a single-pinion type planetary gear unit is employed as a power distribution device 40. The power distribution device 40 is adapted to perform a differential action among the rotary elements. For this purpose, the power distribution device 40 is comprised of: a sun gear 41 serving as a reaction element; a ring gear 42 serving as an output element; a pinion gear meshing with both the sun gear 41 and the ring gear 42; and a carrier 5 serving as an input element while holding the pinion gear. The engine 8 is connected with the carrier 43, and a motor (i.e., a motor-generator) 44 is connected with the sun gear 41. The ring gear 42 is adapted to output the torque to the drive wheels (not shown), and since the vehicle weight is heavy, a rotational speed of the engine 8 is changed by changing a rotational speed of the motor 44. Thus, the rotational speed of the engine 8 is varied continuously by using the motor 44 as a generator or a motor.

Figure 9:
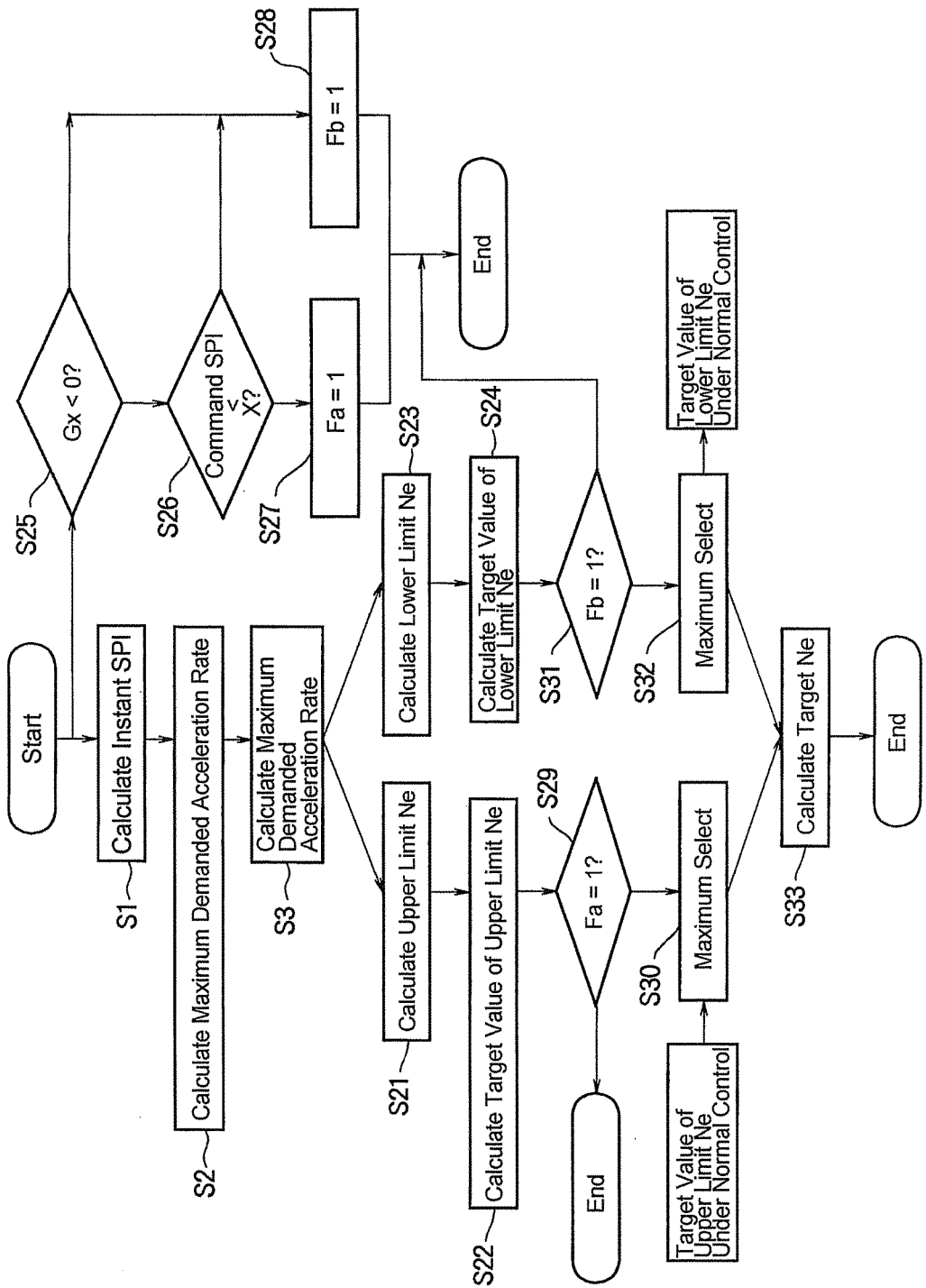
FIG. 9 is a flowchart explaining a control example to be carried out by the driving force control system of the present invention applied to a hybrid vehicle.

In the hybrid vehicle thus structured, a target speed of the engine is calculated in a manner to achieve a required power determined based on the vehicle speed and the opening degree of the accelerator while optimizing the fuel economy, and the rotational speed of the engine is controlled by the motor in a manner to achieve the target speed thus calculated. In the hybrid vehicle, therefore, the rotational speed of the engine 8 can be varied arbitrarily by operating the engine 8 away from the optimum fuel economy curve, so that a vehicle behavior can be varied depending on how to control the rotational speed of the engine 8. According to the present invention, the driving force control system is configured to determine a target upper limit value and a target lower limit value of the engine speed on the basis of the command SPI as explained below. Specifically, provided that the present invention is applied to the hybrid vehicle, the driving force control system determines the target upper limit value (as will be simply called an "upper limit value") and the target lower limit value (as will be simply called an "lower limit value") of the engine Ne, on the basis of the index representing the driving preference or the intension of the driver (i.e., the command SPI). Referring now to FIG. 9, there is shown a flowchart explaining such a control. As described, the control shown in FIG. 9 is configured to further change the upper limit value and the lower limit value of the engine speed calculated based on the maximum demanded acceleration rate, in accordance with the value of the command SPI. To this end, as the foregoing examples, the instant SPI as the synthesized acceleration of the longitudinal acceleration and the lateral acceleration is calculated (at step S1), and the command SPI is calculated (at step S2). Then, the maximum demanded acceleration rate is calculated based on the command SPI (at step S3). Thus, those steps are similar to those in the example shown in FIG. 2.

As described, this example is applied to the hybrid vehicle in which the speed ratio is varied continuously, and in order to change the speed ratio of the hybrid vehicle stepwise, a relation between the vehicle speed and the acceleration under each speed ratio is preinstalled in the form of the map, as explained with reference to the map shown in FIG. 4. Therefore, provided that the maximum demanded acceleration rate and the vehicle speed are known, the acceleration can be obtained with reference to the map. Then, a required driving force is calculated based on the obtained acceleration and the vehicle weight, and a required power and an upper limit value of the engine speed Ne are calculated based on the calculated required driving force (at step S21). The calculation of step S21 is carried out under the predetermined basic characteristic. That is, although the upper limit value of the engine speed Ne is calculated based on the maximum demanded acceleration rate and the vehicle speed, the driving preference or intension of the driver is not sufficiently reflected thereon. Therefore, a target value of the upper limit of the engine speed Ne is calculated based on the command SPI (at step S22). For example, the calculation of step S22 is carried out with reference to a preinstalled map determining the upper limit value of the engine speed Ne or a correction value thereof with respect to the command SPI and the vehicle speed. To this end, a graph similar to that shown in FIG. 3 is used as the map at step S22. In the map, specifically, the horizontal axis represents the vehicle speed, and the longitudinal axis represents the upper limit of the engine speed Ne. A straight diagonal line representing the target value extends from the original point, and a gradient thereof is determined by the command SPI or a predetermined value based thereon. Therefore, the gradient of the diagonal line gets steeper with an increase in the command SPI.

Figure 10:
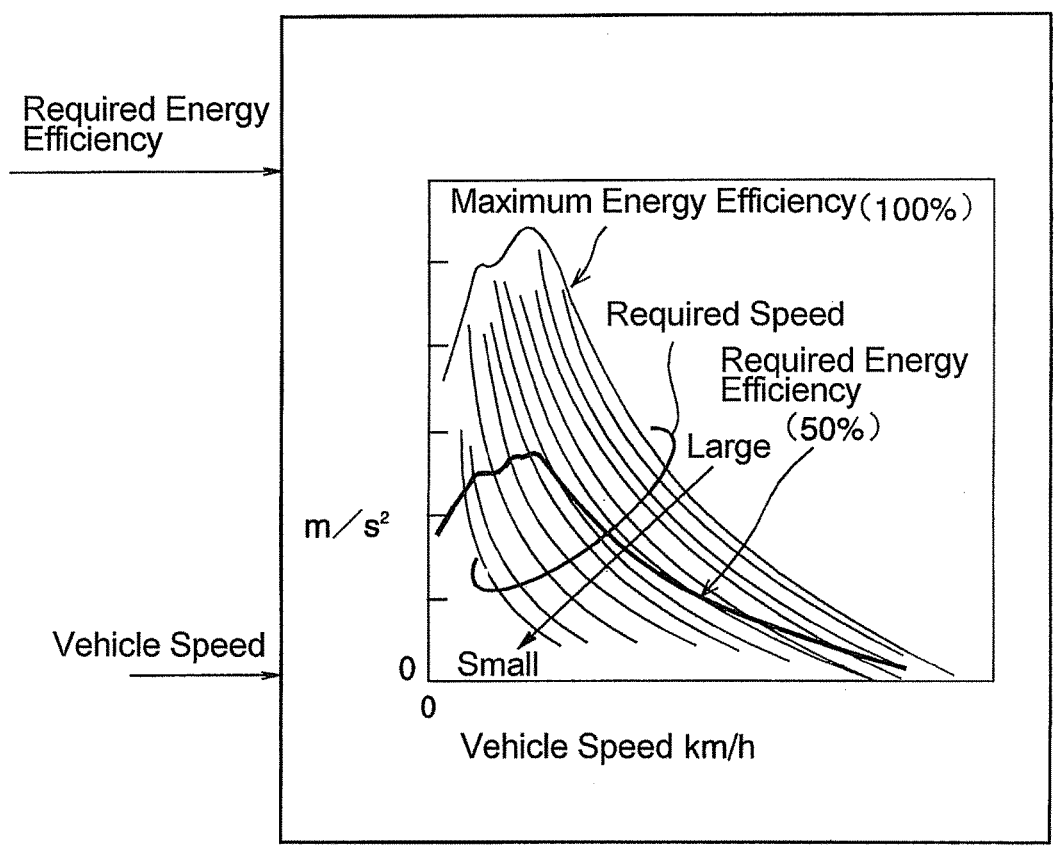
FIG. 10 shows one example of a map for determining a lower limit speed.

At the same time with the calculation of the upper limit of the engine speed Ne at step S21, a lower limit value of the engine speed Ne is calculated (at step S23). As described, this example is applied to the hybrid vehicle in which the speed ratio is varied continuously, and a relation between the vehicle speed and the acceleration can be determined in advance with respect to a required speed, as shown in FIG. 10. In order to obtain the acceleration with respect to the current vehicle speed and the required speed, a line representing the maximum demanded acceleration rate is added in FIG. 10. Therefore, as the case of obtaining the upper limit value, the lower limit value of the engine speed Ne can be obtained taking into consideration a vehicle weight and so on. However, the driving preference or intension of the driver is not sufficiently reflected on the lower limit of the engine sped Ne thus calculated. Therefore, a target value of the lower limit value of the engine speed Ne is calculated based on the command SPI (at step S24). For example, the calculation of step S24 is carried out with reference to a preinstalled map determining the lower limit value of the engine speed Ne or a correction value thereof with respect to the command SPI and the vehicle speed. To this end, a graph similar to that shown in FIG. 6 is used as the map at step S24. In the map, specifically, the horizontal axis represents the vehicle speed, and the longitudinal axis represents the lower limit of the engine speed Ne. In addition, a plurality of diagonal straight lines with gentle gradient without passing through the original point are determined in the map, and the lower limit value is determined based on the diagonal line selected from those lines.

The example shown in FIG. 9 is configured to determine whether or not the longitudinal acceleration Gx is smaller than "0", in other words, whether or not the longitudinal acceleration Gx is negative, in the beginning of the routine (at step S25). That is, at step S25, it is determined whether or not the vehicle is decelerated. If the vehicle is accelerated so that the answer of step S25 is NO, it is determined whether or not the command SPI is smaller than a predetermined threshold X (at step S26). The threshold X is a criterion to select the driving mode, and according to the present invention, the threshold X is determined by the following procedures.

As described, the command SPI is an index representing driver's preference that is calculated based on the acceleration. That is, the command SPI is substantially an absolute value of the synthesized acceleration. Therefore, if the command SPI is set to large value, the characteristics of the output and the speed ratio etc. are adjusted in a manner such that the agility of the vehicle behavior is enhanced. For example, an opening degree of the throttle valve 10 or an output torque with respect to a predetermined opening degree of the accelerator is increased, and a speed ratio is increased to a low speed side (i.e., to a relatively large ratio) to increase the driving force. Thus, those characteristics are altered to enhance the sportiness of the vehicle behavior. Therefore, if the command SPI is increased, the acceleration of the vehicle is increased according to the drive demand such as an opening degree of the accelerator. Specifically, provided that the vehicle is an engine driven automobile, a control for raising the lower limit engine speed is carried out in order to thus increase the acceleration or generate a larger driving force. However, even if the acceleration is changed to comply with the driver's demand, the driver is able to sense a change in the acceleration linearly only within a certain range. If the acceleration is changed beyond such range, it would become difficult for the driver to sense a magnitude of acceleration. In this situation, therefore, it would be difficult for the driver to sense the change in the acceleration linearly from the beginning of the change in the acceleration. As a result, the driver may feel a gap between the actual accelerating operation and the sensed change in the acceleration. In addition, in case the vehicle speed is increased, an available acceleration to the maximum possible acceleration is rather small. In this case, therefore, it would be difficult to increase acceleration even if the accelerating operation is carried out.

According to the result of an experimentation carried out by the inventors of the present invention, it was found that a relation between the intensity and the stimulus became tenuous as an increase in the acceleration, and after the acceleration exceeded 4.5 m/s$^2$, most of the passengers or drivers could not sense an increase in the acceleration as the stimulus. That is, if the command SPI requires a magnitude of acceleration greater than 4.5 m/s², the driver would not be able to sense a change in the acceleration and to determine whether or not the current driving condition is an intended condition.

As described, the threshold X is a criterion for selecting the driving mode, that is, for shifting the driving mode to the normal mode or to the sporty mode. In other words, the threshold X is a criterion for determining a value of the command SPI. As also described, the command SPI is obtained based on the synthesized acceleration, and the synthesized acceleration is increased if the longitudinal or the lateral acceleration is increased by any of a steering operation, accelerating operation and a braking operation, even if the operation is temporal. That is, the command SPI is increased when the steering wheel, the accelerator pedal 12 or the brake pedal 7 is operated significantly even if such operation is not especially intended to enhance the agility (i.e., sportiness) of the vehicle, for example, even if such operation is carried out to dodge an obstacle, or carried out due to negligence. Therefore, if the threshold X as a criterion of the command SPI is too small, a determination to shift to the sporty mode would be satisfied easily. Consequently, the driving mode of the vehicle would be shifted to the sporty mode frequently against the driver's intention. In order to avoid such a disadvantage, it is preferable to set the threshold X within a predetermined range smaller than 4.5 m/s². Meanwhile, a lower limit value of the threshold X is determined in a manner such that the driving mode will not be shifted automatically to the sporty mode frequently. To this end, the lower limit value of the threshold X is determined based on a result of experimentation or simulation. According to the present invention, the lower limit value of the threshold X is set to 3.5 m/s².

In case the answer of step S26 is NO, this means that the vehicle is accelerated and the driver intends to enhance the agility of the vehicle. In this case, therefore, a flag Fa is set to "1" (at step S27), and the routine shown in FIG. 9 is ended. In contrast, in case the answer of step S25 or S26 is YES, a flag Fb is set to "1" (at step S28), and the routine shown in FIG. 9 is ended.

After calculating the target value of the upper limit of the engine speed Ne at step S22, it is determined whether or not the flag Fa is set to "1" (at step S29). If the answer of step S29 is NO, the routine shown in FIG. 9 is ended. By contrast, if the answer of step S29 is YES, an adjustment control is carried out (at step S30). Specifically, the target value of the upper limit of the engine speed Ne under the normal control of the engine to improve the fuel economy, and the target value of the upper limit of the engine speed Ne calculated at step S22 is compared to select the smaller value (i.e., minimum select).

Meanwhile, after calculating the target value of the lower limit of the engine speed Ne at step S24, it is determined whether or not the flag Fb is set to "1" (at step S31). If the answer of step S31 is NO, the routine shown in FIG. 9 is ended. By contrast, if the answer of step S31 is YES, an adjustment control is carried out (at step S32). Specifically, the target value of the lower limit of the engine speed Ne under the normal control of the engine to improve the fuel economy, and the target value of the lower limit of the engine speed Ne calculated at step S24 is compared to select the larger value (i.e., max select). After thus calculating the target value of the upper limit or lower limit of the engine speed Ne, a target engine speed to be used to control the engine is calculated (at step S33).

Thus, according to the control example shown in FIG. 9, the upper limit value and the lower limit value of the engine speed Ne are changed in accordance with the index representing the driving preference. Therefore, the engine performance can be adjusted to comply with the driver's intention. In addition, the engine speed is maintained to the high level when accelerating the vehicle after decelerating the vehicle. Therefore, the re-accelerating performance can be improved so that the driver is allowed to accelerate the vehicle without feeling frustration.

The invention claimed is:

1. A driving force control system for a vehicle having a transmission mechanism for changing an engine speed continuously in accordance with a vehicle speed, comprising a control unit configured to:
   control a speed ratio of the speed of the transmission mechanism on the basis of a vehicle speed and an opening degree of an accelerator;
   determine an index representing a demand to enhance agility of behavior of the vehicle based on an acceleration of the vehicle;
   change the index promptly in the direction to enhance the agility of the vehicle but relatively slower in the direction to moderate the behavior of the vehicle;
   select a sporty mode if the index is larger than a threshold value; and
   restrict the engine speed to an upper limit value that is lower than that to be achieved by a current speed ratio of the transmission when the acceleration is demanded, carry out an upshifting when the engine speed reaches the upper limit value of the current speed ratio, and set the upper limit value to a higher value with an increase in the index, in a case that the sporty mode is selected,
   wherein the upper limit value is set in each stage of the speed ratio based on a maximum demanded acceleration rate which is a ratio of a demanded acceleration to a maximum possible acceleration of the vehicle that is calculated based on the index, and
   wherein the upper limit value is set to a higher value with a reduction in the speed ratio.

2. The driving force control system for a vehicle as claimed in claim 1,
   wherein the relation of the engine speed to the vehicle speed for the case of changing the engine speed by the transmission mechanism is determined in a manner such that the engine speed is increased in proportion to an increase in the vehicle speed from an original point; and
   a speed ratio as a relation of the engine speed to a vehicle speed is changed in accordance with the index and the vehicle speed in a manner such that the speed ratio is set to a larger ratio with an increase in the index representing the demand to enhance agility of behavior of the vehicle.

3. The driving force control system for a vehicle as claimed in claim 2,
   wherein the upper limit value of the engine speed is determined on the basis of the index;
   the upper limit value is set to a higher value with an increase in the index representing the demand to enhance agility of behavior of the vehicle; and
   the speed ratio is changed in accordance with the index, the vehicle speed and the upper limit value, in a manner such that the speed ratio is set to a larger ratio with an increase in the index representing the demand to enhance agility of behavior of the vehicle.

4. The driving force control system for a vehicle as claimed in claim 3,
wherein a lower limit value of the engine speed is changed based on the index; and
the lower limit value is set to a larger value with an increase in the index representing the demand to enhance agility of behavior of the vehicle.

5. The driving force control system for a vehicle as claimed in claim 3, wherein the vehicle includes a hybrid vehicle in which said transmission mechanism is comprised of:
a power distribution device that is adapted to perform a differential action among an input element connected with the engine, a reaction element, and an output element, and
a motor that is connected with the reaction element, and that is adapted to change the engine speed thereby adjusting the engine speed to a target speed.

6. The driving force control system for a vehicle as claimed in claim 2,
wherein a lower limit value of the engine speed is changed based on the index; and
the lower limit value is set to a larger value with an increase in the index representing the demand to enhance agility of behavior of the vehicle.

7. The driving force control system for a vehicle as claimed in claim 2, wherein the vehicle includes a hybrid vehicle in which said transmission mechanism is comprised of:
a power distribution device that is adapted to perform a differential action among an input element connected with the engine, a reaction element, and an output element, and
a motor that is connected with the reaction element, and that is adapted to change the engine speed thereby adjusting the engine speed to a target speed.

8. The driving force control system for a vehicle as claimed in claim 1,
wherein a lower limit value of the engine speed is changed based on the index; and
the lower limit value is set to a larger value with an increase in the index representing the demand to enhance agility of behavior of the vehicle.

9. The driving force control system for a vehicle as claimed in claim 8, wherein the vehicle includes a hybrid vehicle in which said transmission mechanism is comprised of:
a power distribution device that is adapted to perform a differential action among an input element connected with the engine, a reaction element, and an output element, and
a motor that is connected with the reaction element, and that is adapted to change the engine speed thereby adjusting the engine speed to a target speed.

10. The driving force control system for a vehicle as claimed in claim 1,
wherein the engine speed is changed continuously in accordance with an opening degree of an accelerator and the vehicle speed until the index exceeds a threshold value, irrespective of a change in the index.

11. The driving force control system for a vehicle as claimed in claim 10, wherein the vehicle includes a hybrid vehicle in which said transmission mechanism is comprised of:
a power distribution device that is adapted to perform a differential action among an input element connected with the engine, a reaction element, and an output element, and
a motor that is connected with the reaction element, and that is adapted to change the engine speed thereby adjusting the engine speed to a target speed.

12. The driving force control system for a vehicle as claimed in claim 1, wherein the vehicle includes a hybrid vehicle in which said transmission mechanism is comprised of:
a power distribution device that is adapted to perform a differential action among an input element connected with the engine, a reaction element, and an output element, and
a motor that is connected with the reaction element, and that is adapted to change the engine speed thereby adjusting the engine speed to a target speed.

13. The driving force control system for a vehicle as claimed in claim 1,
wherein a lower limit value of the engine speed is changed based on the index; and
the lower limit value is set to a larger value with an increase in the index representing the demand to enhance agility of behavior of the vehicle.

14. The driving force control system for a vehicle as claimed in claim 1, wherein the vehicle includes a hybrid vehicle in which said transmission mechanism is comprised of:
a power distribution device that is adapted to perform a differential action among an input element connected with the engine, a reaction element, and an output element, and
a motor that is connected with the reaction element, and that is adapted to change the engine speed thereby adjusting the engine speed to a target speed.

\* \* \* \* \*